United States Patent
Seok et al.

(10) Patent No.: US 12,482,520 B2
(45) Date of Patent: Nov. 25, 2025

(54) 6T-SRAM-BASED DIGITAL COMPUTING-IN-MEMORY CIRCUITS SUPPORTING FLEXIBLE INPUT DIMENSION

(71) Applicant: THE TRUSTEES OF COLUMBIA UNIVERSITY IN THE CITY OF NEW YORK, New York, NY (US)

(72) Inventors: Mingoo Seok, Tenafly, NJ (US); Jonghyun Oh, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 230 days.

(21) Appl. No.: 18/495,167

(22) Filed: Oct. 26, 2023

(65) Prior Publication Data

US 2024/0170050 A1  May 23, 2024

Related U.S. Application Data

(60) Provisional application No. 63/427,608, filed on Nov. 23, 2022.

(51) Int. Cl.
| | | |
|---|---|---|
| G06F 17/16 | (2006.01) | |
| G11C 11/4094 | (2006.01) | |
| G11C 11/4096 | (2006.01) | |
| G06N 3/063 | (2023.01) | |
| G11C 7/10 | (2006.01) | |
| G11C 11/54 | (2006.01) | |

(52) U.S. Cl.
CPC .......... *G11C 11/4096* (2013.01); *G06F 17/16* (2013.01); *G11C 11/4094* (2013.01);
(Continued)

(58) Field of Classification Search
CPC .. G11C 11/4096; G11C 11/4094; G06F 17/16
(Continued)

(56) References Cited

U.S. PATENT DOCUMENTS 5,499,215 A * 3/1996 Hatta ................. G11C 7/10
365/230.09
9,846,613 B2 12/2017 Arslan et al.
(Continued)

OTHER PUBLICATIONS

Chih et al., "An 89TOPS/W and 16.3TOPS/mm2 all-digital SRAM-based full-precision compute-in memory macro in 22nm for machine-learning edge applications," 2021 IEEE International Solid-State Circuits Conference (ISSCC) pp. 252-254 (2021).
(Continued)

*Primary Examiner* — Ly D Pham
(74) *Attorney, Agent, or Firm* — Baker Botts L.L.P.

(57) ABSTRACT

Compute-in-memory (CIM) devices and methods for performing vector-matrix multiplication (VMM) are provided. The disclosed CIM device can include a static random access memory (SRAM) array. The SRAM array can include a plurality of column structures. Each column structure can include eight sub-column structures. Each sub-column structure can include at least one bitcell sharing a pair of a local bitline (LBL) and LBLb that can be connected to a pair of global bitlines (GBL) via switches. Each sub-column comprises at least one NOR gate. An even-numbered bitcell can include a wordline 1 (WL1) for a left access transistors, and an odd-numbered bitcell can include a wordline 2 (WL2) for a right access transistors. Every eight columns (8 columns) can be configured to share a hybrid compressor adder-tree (HCA), followed by a bit-first accumulation (BFA).

17 Claims, 17 Drawing Sheets

(52) U.S. Cl.
CPC ............ *G06N 3/063* (2013.01); *G11C 7/1006* (2013.01); *G11C 11/54* (2013.01)

(58) Field of Classification Search
USPC .................................................. 365/189.011
See application file for complete search history.

(56) References Cited

U.S. PATENT DOCUMENTS

| | | | |
|---|---|---|---|
| 10,579,974 | B1 | 3/2020 | Reed |
| 10,616,669 | B2 | 4/2020 | Kumar et al. |
| 10,762,475 | B2 | 9/2020 | Song et al. |
| 11,061,646 | B2 | 7/2021 | Sumbul et al. |
| 2004/0223369 | A1* | 11/2004 | Choi .................. G11C 8/10 365/154 |
| 2005/0078542 | A1* | 4/2005 | Oh .................. G11C 7/1039 365/230.03 |
| 2007/0002674 | A1* | 1/2007 | Lee .................. G11C 11/4096 365/233.1 |
| 2008/0186795 | A1* | 8/2008 | Lih .................. G11C 11/417 365/228 |
| 2010/0014345 | A1* | 1/2010 | Choi .................. G11C 5/025 365/163 |
| 2011/0063898 | A1* | 3/2011 | Ong .................. G11C 7/18 365/158 |
| 2012/0243360 | A1* | 9/2012 | Ferrant .................. G11C 11/4097 365/207 |
| 2021/0327474 | A1* | 10/2021 | Seok .................. G11C 11/419 |

OTHER PUBLICATIONS

Fujiwara et al., "A 5-nm 254-TOPS/W 221-TOPS/mm2 fully digital computing-in-memory macro supporting wide-range dynamic-voltage-frequency scaling and simultaneous MAC and write operations," 2022 IEEE International Solid-State Circuits Conference (ISSCC) pp. 1-3 (2022).

Huang et al., "In-Memory computing architecture for a convolutional neural network based on spin orbit torque MRAM," Electronics. 11(8):1245 (2022) 17 pgs.

Kiani et al., "A fully hardware-based memristive multilayer neural network," Sci Adv 7:eabj4801 (2021).

Lee et al., "A 12nm 121-TOPS/W 41.6-TOPS/mm2 all digital full precision SRAM-based compute-in-memory with configurable bit-width for AI edge applications," 2022 IEEE Symposium on VLSI Technology and Circuits (VLSI Technology and Circuits) pp. 24-25 (2022).

Liu et al., "Two-dimensional materials for next-generation computing technologies," Nat Nanotechnol 15(7):545-557 (2020).

Mackin et al., "Optimised weight programming for analogue memory-based deep neural networks," Nat Commun 13:3765 (2022) 12 pgs.

Pereira et al., "Efficient hardware design and implementation of the voting scheme-based convolution," Sensors (Basel) 22:2943 (2022) 18 pgs.

Tu et al., "A 28nm 29.2TFLOPS/W BF16 and 36.5TOPS/W INT8 Reconfigurable Digital CIM Processor with Unified FP/INT Pipeline and Bitwise In-Memory Booth Multiplication for Cloud Deep Learning Acceleration," ISSCC, 2022, 3 pgs.

Wan et al., "A compute-in-memory chip based on resistive random-access memory," Nature 608(7923):504-512 (2022).

Wang et al., "DIMC: 2219TOPS/W 2569F2/b Digital In-Memory Computing Macro in 28nm Based on Approximate Arithmetic Hardware," ISSCC, 2022, 3 pgs.

Yan et al., "A 1.041-Mb/mm2 27.38-TOPS/W Signed-INT8 Dynamic-Logic-Based ADC-less SRAM Compute-In-Memory Macro in 28nm with Reconfigurable Bitwise Operation for AI and Embedded Applications," ISSCC, 2022, 35 pgs.

Yu et al., "Evaluating architecture impact on system energy efficiency," PLoS One 12(11):e0188428 (2017).

* cited by examiner

6T-SRAM-BASED DIGITAL COMPUTING-IN-MEMORY CIRCUITS SUPPORTING FLEXIBLE INPUT DIMENSION

CROSS-REFERENCE TO RELATED APPLICATION

This application claims priority to U.S. Provisional Patent Application Ser. No. 63/427,608, filed Nov. 23, 2022, which is hereby incorporated by reference herein in its entirety.

STATEMENT REGARDING FEDERALLY SPONSORED RESEARCH

This invention was made with government support under HR0011-12-C-0134 awarded by the Defense Advanced Research Projects Agency. The government has certain rights in the invention.

BACKGROUND

Static Access Random Memory (SRAM)-based compute-in-memory (CIM) hardware can provide improvements in energy efficiency and throughput for vector-matrix multiplications (VMM). Its digital version (i.e., DCIM) can also provide improved superior robustness, precision, and scalability over analog-mixed-signal counterparts.

However, certain DCIMs can show reduced weight density (Kb/mm$^2$) because they employ a large amount of arithmetic hardware. Time-sharing/reusing arithmetic hardware across inputs and weights can improve weight density but can naturally degrade the compute density (TOPS/mm$^2$). Also, energy efficiency (TOPS/W) is not necessarily impacted since the amount of capacitive charging and discharging remains the same for a given computation.

Accordingly, there exists a need for methods and systems that can address a trade-off between weight density and compute density.

SUMMARY

The disclosed subject matter provides compute-in-memory (CIM) devices and methods for performing vector-matrix multiplication (VMM). An example CIM device can include a static random access memory (SRAM) array. In non-limiting embodiments, the SRAM array can include a plurality of column structures. Each column structure can include eight sub-column structures. Each sub-column structure can include at least one bitcell sharing a pair of a local bitline (LBL) and local bitline bar (LBLb) that can be connected to a pair of global bitlines (GBL) via switches. In non-limiting embodiments, each sub-column can include at least one NOR gate. In non-limiting embodiments, an even-numbered bitcell can include a wordline 1 (WL1) for a left access transistor, and an odd-numbered bitcell can include a wordline 2 (WL2) for a right access transistor. In non-limiting embodiments, every eight columns (8 columns) can be configured to share a hybrid compressor adder-tree (HCA) scheme, followed by a bit-first accumulation (BFA).

In certain embodiments, the CIM device can be configured to perform a static dual wordline access without a pre-charging operation by accessing two consecutive bitcells in each sub-column using the LBL and the LBLb.

In certain embodiments, the HCA can include a plurality of 15:4 compressors followed by a 4b 8-input adder tree. In non-limiting embodiments, the adder tree can include a carry-in port of ripple carry adders (RCA). The RCA can be 4b RCAs, 6b RCAs, 8b RCAs, or combinations thereof.

In certain embodiments, the BFA can include a 23b RCA, a 30b register, and bi-directional shifters to perform the shift-and-accumulate on an output of HCA (partial sums). In non-limiting embodiments, the BFA can be configured to accumulate the partial products across input bits followed by inputs.

In certain embodiments, the BFA can be configured to a bi-directional bit-serial input operation.

In certain embodiments, the HCA and the BFA can include area-efficient transmission-gate (TG)-based full adder cell (FA) and HA. In non-limiting embodiments, the FA can be an input-inverted FA and/or the HA can be an input-inverted HA.

In certain embodiments, the BFA can include a polarity-inverted multiplexer and a D-flip-flop (DFF).

In certain embodiments, the NOR gate can be configured to be a 1b multiplier.

In certain embodiments, the CIM device can include 16 HCAs and 16 BFAs.

In certain embodiments, the SRAM array can include a row peripheral configured to control a vector-matrix multiplication (VMM) operation and an SRAM Read/Write (R/W) operation. In non-limiting embodiments, the SRAM array can include a column peripheral configured to control GBLs for the SRAM R/W operation.

The disclosed subject matter provides a method for performing vector-matrix multiplication. An example method can include activating two consecutive wordline 1s (WL1s) in each sub-column of a compute-in-memory (CIM) device, feeding corresponding two input activation bits via ILs to the NOR gates using a row peripheral of the CIM device, generating a total of 16 8-b partial products using the column, where each column comprises eight sub-columns, adding up the 16 partial products and produces partial sums using an HCA, performing a shift-and-accumulate the partial sums using BFA, producing a VMM result using the results from the shift-and-accumulate the partial sums. In non-limiting embodiments, the WL1s can be configured to transfer two weight bits, via LBL and LBLb, to the two NOR gates in the sub-column.

In certain embodiments, the VMM result can be produced from an 8b 128×16d (dimension) VMM in 64 clock cycles. In non-limiting embodiments, the VMM result can be a 23b 16d vector.

BRIEF DESCRIPTION OF THE DRAWINGS

FIG. 5(*b*) provides a diagram showing the disclosed bit-first accumulation (BFA) scheme in accordance with the disclosed subject matter.

FIG. 6(*b*) provides a diagram showing an example HA in accordance with the disclosed subject matter. FIG. 6(*c*) provides a diagram showing an example one-input-inverted FA in accordance with the disclosed subject matter. FIG. 6(*d*) provides a diagram showing an example one-input-inverted HA in accordance with the disclosed subject matter.

FIG. 10(*b*) provides a graph showing an example measured compute density (TOPS/mm2) in accordance with the disclosed subject matter. FIG. 10(*c*) provides a graph showing an example measured energy efficiency (TOPS/W) across VDDs in accordance with the disclosed subject matter. FIG. 10(*d*) provides a graph showing an example clock frequencies in accordance with the disclosed subject matter.

Figure 1:
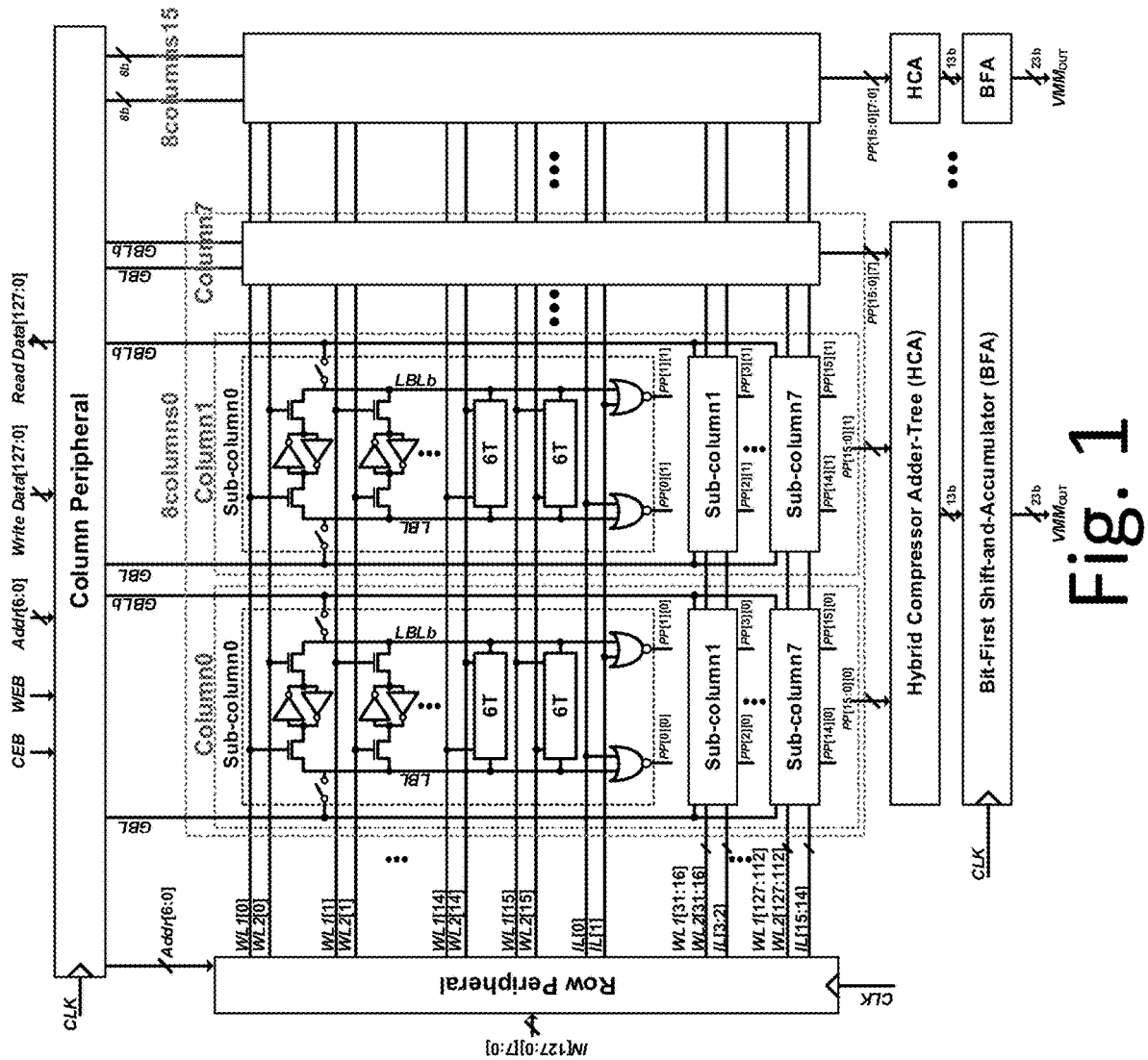
FIG. 1 provides a diagram showing an example D6CIM microarchitecture in accordance with the disclosed subject matter.

The accompanying drawings, which are incorporated and constitute part of this disclosure, illustrate certain embodiments and serve to explain the principles of the disclosed subject matter.

DETAILED DESCRIPTION

Reference will now be made in detail to the various exemplary embodiments of the disclosed subject matter, which are illustrated in the accompanying drawings.

The terms used in this specification generally have their ordinary meanings in the art, within the context of the disclosed subject matter, and in the specific context where each term is used. Certain terms are discussed below or elsewhere in the specification to provide additional guidance in describing the disclosed subject matter.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, column structure can mean the implemented structure including SRAM bitcells, multipliers, and compressor for one column in macro array. The column structure can include several subcolumn structures, each having only 16 SRAM bitcells and two multipliers. LBLb is the local bitline bar, one part of a differential pair; the other is LBL. Bitlines can be long wires connected to several SRAM bitcells simultaneously for write/read operation. HCA structure can be a hybrid compressor adder tree. BFA structure can be bit-first shift-and-accumulator. Partial product can mean the multiplication result with two partial signals. MSB can be the most significant bit; LSB can be a less significant bit. Row peripheral can mean row-wise peripheral circuits including an input driver and wordline decoder. Column peripheral can mean column-wise circuits including a write/read SRAM controller and sensing circuit.

The disclosed subject matter provides techniques for performing vector-matrix multiplication (VMM). The disclosed subject matter provides systems and methods for performing VMM. The disclosed systems can include a compute-in-memory (CIM) device. In non-limiting embodiments, the CIM device can include a static random access memory (SRAM) array. In non-limiting embodiments, the CIM device can include a 128×128 6T SRAM array.

In certain embodiments, the SRAM can include a plurality of column structures, i.e., the implemented structures, including SRAM bitcells, multipliers, and compressors for one column in the macro array. In non-limiting embodiments, each column structure can include sub-column structures. Each column structure can include several subcolumn structures, each having only 16 SRAM bitcells and two multipliers. For example, each column structure can include eight sub-column structures. In non-limiting embodiments, each sub-column structure can include at least one bitcell sharing a pair of a local bitline (LBL) and local bitline bar (LBLb). A bitcell refers to the amount of space on a digital storage medium used to host/record a single bit of information, and a bitline refers to an array of columns of memory cells in random access memory, used with the wordline to generate the address of each cell. In non-limiting embodiments, each sub-column can have 16 6T bitcells sharing a pair of LBL and LBLb.

In certain embodiments, the LBL and LBLb can be connected to a pair of global bitlines (GBL) via switches. Via GBL (GBLb), the column peripheral (write/read controller) can access bitcell because GBL plays a role as a bridge between LBL (LBLb) and column peripheral while LBL (LBLb) is connected to bitcells. In non-limiting embodiments, each sub-column has at least one NOT OR (NOR) gate, each serving as a 1b multiplier. For example, each sub-column also contains two NOR gates.

In certain embodiments, an even-numbered bitcell can include a wordline 1 (WL1) for a left access transistor, and an odd-numbered bitcell can include a wordline 2 (WL2) for a right access transistor, or vice versa. In non-limiting embodiments, the disclosed device can include a row peripheral, which can control WLs and input lines (ILs) for VMM operation and WLs for SRAM Read/Write (R/W) operation. The row peripheral can be row-wise peripheral circuits including input drivers to feed input activation data to a macro and a wordline decoder to access bitcells. In non-limiting embodiments, the disclosed device can include a column peripheral, which can control GBLs for SRAM R/W. The column peripheral can be column-wise peripheral circuits including a write/read SRAM controller and sensing circuits to sense voltages of GBL and GBLb for read operation.

In certain embodiments, every eight columns (8 columns) can be configured to share a hybrid compressor adder-tree (HCA), followed by a bit-first accumulation (BFA) structure. The HCA structure can be a hybrid compressor and adder tree, which can include combinational arithmetic logic using 15:4 compressors in the front end and a conventional adder tree in the back end. BFA structure can be a bit-first shift-and-accumulator that adopts a bi-directional serial input scheme to lower wordline switching, directly affecting power efficiency. In non-limiting embodiments, the disclosed device can include 16 HCAs and 16 BFAs.

In certain embodiments, the disclosed device can be configured to perform an 8b 128×16d (dimension) VMM in 64 clock cycles. For example, the device can first activate two consecutive WL1s in each sub-column, which transfers two weight bits, via LBL and LBLb, to the two NOR gates in that sub-column. At the same time, the row peripheral can feed the corresponding two input activation bits via ILs to the NOR gates. Since each column has eight sub-columns, one 8 columns (64 sub-columns) can generate a total of 16 8-b partial products (PP[15:0][7:0]). The HCA then can add up 16 partial products and produce partial sums, and the BFA can perform shift-and-accumulate the partial sums. This process can be repeated (e.g., eight times) while feeding the rest of the input bits in the bit-serial fashion and then again eight times for providing the rest of the inputs corresponding to the weights in each sub-column. The disclosed device can produce the VMM result (VMM$_{OUT}$), a 23b 16d vector.

In certain embodiments, the disclosed device can be configured to perform a static dual wordline access. In non-limiting embodiments, the device can be configured to perform a static dual wordline access without a pre-charging operation by accessing two consecutive bitcells in each sub-column using the LBL and the LBLb. For example, the disclosed device can statically access two consecutive bitcells in each sub-column using LBL and LBLb. The disclosed device configured to perform the static dual wordline access can reduce reducing switching activities on LBLs and use low swing signals on LBLs via the threshold voltage ($V_{th}$) drop of the access transistor, lowering access energy consumption.

In certain embodiments, the disclosed device can include a hybrid compressor adder-tree structure (HCA). For example, the HCA can have a plurality of compressors (e.g., 15:4 compressors) followed by an input adder tree (e.g., 4b 8-input adder tree). In non-limiting embodiments, the adder tree can include a carry-in port of ripple carry adders (RCA). The RCA can be 4b RCAs, 6b RCAs, 8b RCAs, or combinations thereof. For example, the disclosed HCA can be shared by one 8 columns (the macro has a total of 16 HCAs). It can have eight 15:4 compressors followed by one 4b 8-input adder tree. As one 8 columns produces 8×16b data, eight compressors can process only 8×15b data. Instead of adding another compressor to deal with the remaining 8b, the disclosed carry-in port of the 4b ripple carry adders (RCA) can be used in the adder tree.

In certain embodiments, the disclosed device can be configured to perform bit-first accumulation. Particularly, input vectors can include several inputs, each of which can include a number bit from most significant bit (MSB) to less significant bit (LSB). There can be two ways to process such an input vector: first, a conventional approach can be to use the input-first direction such that the macro first processes with all MSB of all input, then it jumps to all MSB-1 of all inputs. Second, and in accordance with the disclosed subject matter, bit-first accumulation can be used. This can include processing with all bits (from MSB to LSB) of partial inputs, then jumps to the next partial input (accordingly, it can be referred to as a "bit-first scheme"). In non-limiting embodiments, the disclosed device can include bit-first accumulation (BFA) hardware. For example, the BFA can include a 23b RCA, a 30b register, and bi-directional shifters to perform the shift-and-accumulate on an output of HCA (partial sums). Register can be a D-flip-flop cell that can store 1-bit data logically. The shifter can contain multiplexers and can move up or down data digits.

In certain embodiments, the BFA can be configured to accumulate the partial products across input bits first and then inputs. For example, the disclosed device can accumulate the partial products of 16 inputs' MSBs and 16 weights (all bits), then the same inputs' second MSBs and the same weights to the inputs' LSBs. Then, it repeats the accumulation using the subsequent 16 inputs and 16 weights. In non-limiting embodiments, the disclosed device can reduce the switching activities on WL and LBLs (e.g., by ~8×) since it does not require to access new weights until it processes all 8 bits of inputs and thereby does not switch WLs and LBLs. The reduced switching activities can improve energy efficiency.

In certain embodiments, the BFA with the bi-directional shifters can be configured to perform a bi-directional bit-serial input operation. The disclosed device with the shifters can reduce the area of the BFA. For example, the disclosed bi-directional bit-serial input operation can alternate the bit-serial direction, e.g., from LSB to MSB, then from MSB to LSB. In this operation, the disclosed device can need only 1b left and right shifters and one 4:1 multiplexer, helping to reduce the area of BFA while enabling flexible 1-to-8b computation.

In certain embodiments, the disclosed HCA and BFA can include a plurality of full adder (FA) cells. To minimize the area overhead, the disclosed device can include the area-efficient transmission-gate (TG)-based FA and half adder (HA). The disclosed TG-based cells can be configured to not to induce a $V_{th}$ drop. In non-limiting embodiments, the RCAs and compressors can be designed using the TG-based FAs and HAs. The RCAs can include inverters to restore the slew caused by TG. In non-limiting embodiments, to reduce polarity changes caused by inverters, the disclosed device can have the FA and HA versions with one input inverted and replace certain regular FAs and HAs with the input-inverted versions. Similarly, the BFA can include polarity-inverted multiplexers and D-flip-flops (DFF) to ensure the correctness of logic without adding extra inverters.

In certain embodiments, to shorten certain wires such as LBLs, WLs, and ILs to improve the throughput and energy efficiency, the disclosed device can have various configurations. For example, in the layout of the 8 columns and the corresponding HCA and BFA modules, below each 16-bit-cell sub-column, two NOR gates can be placed, minimizing the length of LBLs. In non-limiting embodiments, the FAs, which form one 15:4 compressor, can be distributed in each column to reduce the wire length from the NOR gates. In non-limiting embodiments, the adder tree of the HCA and the BFA can be placed below the 8 columns to minimize the width of the 8 columns, thereby shortening WLs.

In certain embodiments, the disclosed subject matter provides methods of performing vector-matrix multiplication. An example method can include activating two consecutive wordline 1s (WL1s) in each sub-column of a compute-in-memory (CIM) device. In non-limiting embodiments, the WL1s can be configured to transfer two weight bits, via LBL and LBLb, to the two NOR gates in the sub-column. The method can further include feeding corresponding two input activation bits via ILs to the NOR gates using a row peripheral of the CIM device, generating partial products (e.g., a total of 16 8-b partial products) using the column. Partial products can be the multiplication result with two partial signals. In non-limiting embodiments, each column can include eight sub-columns.

In certain embodiments, the method can further include adding up the 16 partial products and producing partial sums using an HCA, performing a shift-and-accumulate the partial sums using BFA, and producing a VMM result using the results from the shift-and-accumulate the partial sums. In non-limiting embodiments, the VMM result can be produced from an 8b 128×16d (dimension) VMM in 64 clock cycles. In non-limiting embodiments, the VMM result can be a 23b 16d vector.

EXAMPLES

Example 1: D6CIM: 60.4-TOPS/W, 1.46-TOPS/mm2, 1005-Kb/mm2 Digital 6T-SRAM-Based Compute-in-Memory Macro Supporting 1-to-8b Fixed-Point Arithmetic in 28-nm CMOS This Example shows a digital 6T-SRAM-based compute-in-memory macro named D6CIM, which can support 1-to-8b fixed-point arithmetic. Based on the time-sharing (reuse) architecture, D6CIM can be designed with three techniques in accordance with the disclosed subject matter: static dual-wordline access, hybrid compressor adder tree, and bit-first accumulation. D6CIM was prototyped in 28-nm CMOS. D6CIM can provide unexpected improvements in the three key metrics: energy efficiency, weight density, and compute density.

Microarchitecture: FIG. 1 shows an example microarchitecture of D6CIM. It has a 128×128 6T SRAM array. The disclosed array can have 8b weights; thus, the array can store 128×16 weights. Each column contains eight sub-columns, each having 16 6T bitcells sharing a pair of LBL and LBLb. The LBLs can be connected to a pair of global bitlines (GBL) via switches. Each sub-column can also contain two NOR gates, each serving as a 1b multiplier. The even-numbered bitcells can have WL1 (WL2) for the left (right) access transistors; the odd-numbered bitcells can have WL2 (WL1) for the left (right) access transistors. Every eight columns (8 columns) share one HCA, followed by the BFA. The macro can employ 16 HCAs and 16 BFAs. It can also contain the row peripheral, which can control WLs and input lines (ILs) for VMM operation, and WLs for SRAM Read/Write (R/W) operation; it can contain the column peripheral, which controls GBLs for SRAM R/W.

The disclosed D6CIM can perform an 8b 128×16d (dimension) VMM in 64 clock cycles. It can first activate two consecutive WL1s in each sub-column, which transfers two weight bits, via LBL and LBLb, to the two NOR gates in that sub-column. At the same time, the row peripheral can feed the corresponding two input activation bits via ILs to the NOR gates. Since each column has eight sub-columns, one 8 columns (64 sub-columns) can generate a total of 16 8-b partial products (PP[15:0][7:0]). The HCA then adds up 16 partial products and produces partial sums, and the BFA performs shift-and-accumulate the partial sums. This process can be repeated eight times while feeding the rest of the input bits in the bit-serial fashion and then again eight times for providing the rest of the inputs corresponding to the weights in each sub-column. The D6CIM can produce the VMM result ($VMM_{OUT}$), a 23b 16d vector.

Static Dual-Wordline Access: As shown in FIG. 2(a), D6CIM statically accesses two consecutive bitcells 201 in each sub-column using LBL 202 and LBLb 203. Compared to the dynamic dual-wordline access technique, the disclosed techniques and methods eliminate the pre-charging operation, significantly reducing switching activities on LBLs. Also, it uses reduced (low) swing signals on LBLs via the threshold voltage ($V_{th}$) drop of the access transistor. The disclosed technique can reduce access energy consumption.

The chance of read-upset can increase since previous access can discharge LBLs to 0V. However, in the disclosed techniques and systems, the probability is meager for two reasons. First, the access can be single-ended, which exhibits more robustness to read upset than the conventional differential access. Second, each bitcell can see short LBL, shared by only 16 bitcells, exhibiting reduced (e.g., small) parasitic capacitance. To evaluate the read-upset risk, Monte-Carlo simulations were performed on the upset margin ($V_{mg}$) 204, which is defined as $V_{mg}=V_Q-V_{flip}$, where $V_Q$ 205 is the bitcell's storage voltage, and $V_{flip}$ 206 is the $V_Q$ that upsets the bitcell (FIG. 2(b)). The simulation shows that $V_{mg}$ remains positive even under the 12-σ worst case (FIG. 2(c)), confirming the robustness of the disclosed technique.

The static access technique reduces the voltage swing on LBLs to $VDD-V_{th}$. This can degrade the noise margin and increase multiplication delay ($T_{mul}$, defined in FIG. 2(b)). To address these problems, the PN ratio of the NOR gates was skewed using high and low $V_{th}$ (HVT, LVT) devices. 100-k Monte-Carlo simulations were performed, confirming all correct functionality and a small variability of $T_{mul}$ (σ/μ=11%, FIG. 2(d)).

Hybrid Compressor Adder-Tree Scheme: The disclosed subject matter provides the HCA hardware. One 8 columns in D6CIM produces 16 8b partial products (PP[15:0][7:0]). To sum up all PPs, existing works employ a 16-input 8b adder tree, which incurs a significant area overhead. The disclosed HCA can support the same operation but requires fewer transistors, improving weight density and energy efficiency.

Figure 3:
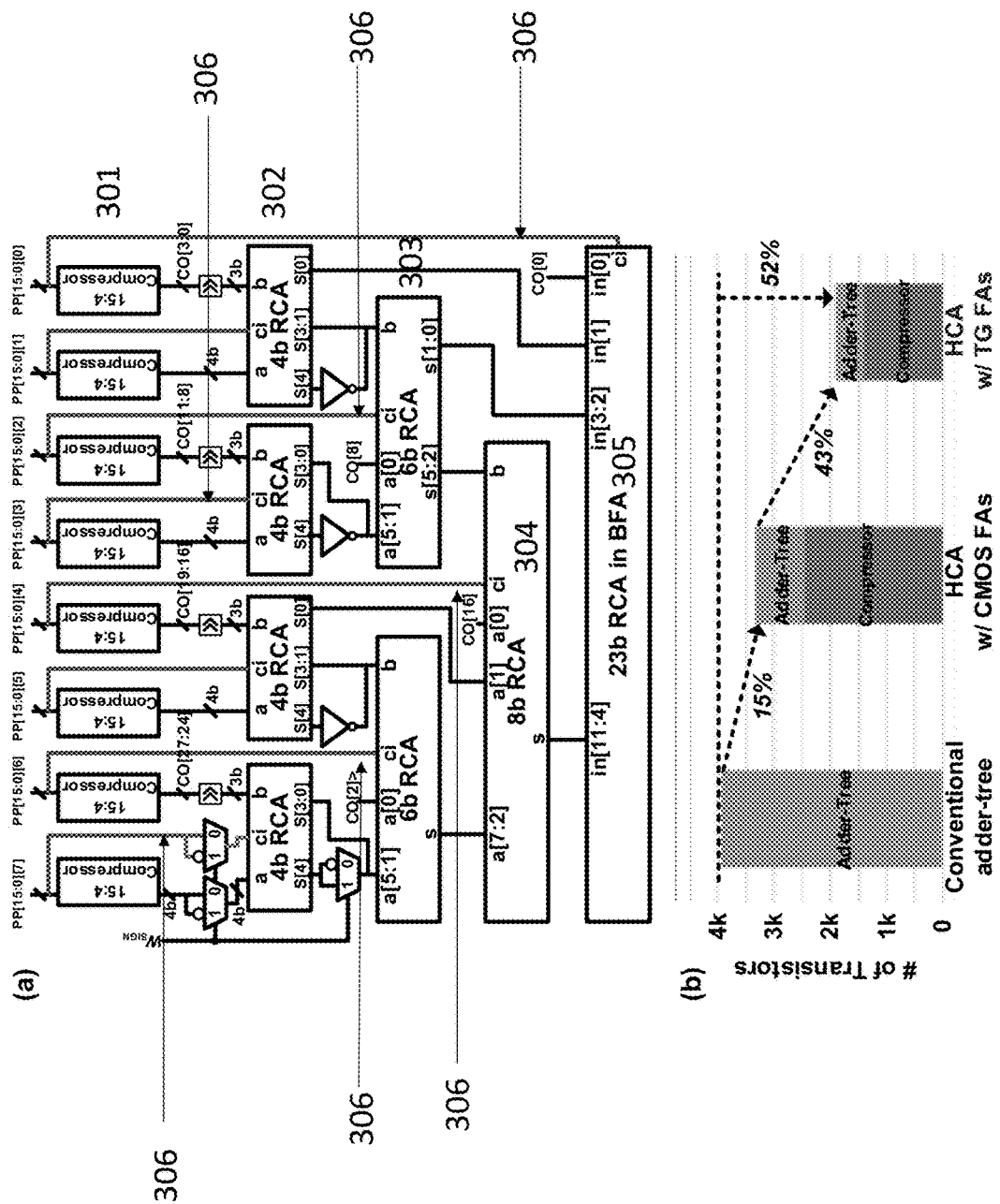
FIG. 3(a) provides a diagram showing an example hybrid compressor adder-tree (HCA) in accordance with the disclosed subject matter.
FIG. 3(b) provides a graph showing the disclosed techniques (HCA and TG-based FAs) can reduce transistor count by 52% as compared to the adder-tree-only scheme using CMOS FA cells.

FIG. 3(a) shows the detailed microarchitecture of the HCA. One HCA is shared by one 8 columns (the macro has a total of 16 HCAs). It has eight 15:4 compressors 301 followed by one 4b 8-input adder tree 302. Note that one 8 columns produces 8×16b data, and eight compressors can process only 8×15b data. Instead of adding another compressor to deal with the remaining 8b, the carry-in port of the 4b ripple carry adders (RCA) in the adder tree 302 was used (see the lines 306 in FIG. 3(a)), as e only four 4b RCAs and, thus, four carry-in ports. Therefore, the carry-in ports of the two 6b RCAs 303, one 8b RCA 304 in HCA, and the 23b RCA 305 in the BFA were used. Also, one input of the 4b RCA can be 3b due to the right-shift operation needed for alignment. This can reduce the size of the 4b RCAs. It can reduce the number of transistors by 15% compared to the conventional adder-tree-only scheme (FIG. 3(b)). Also, the circuit-level optimization on full adder (FA) cells reduces the number of transistors by another 43%.

Figure 4:
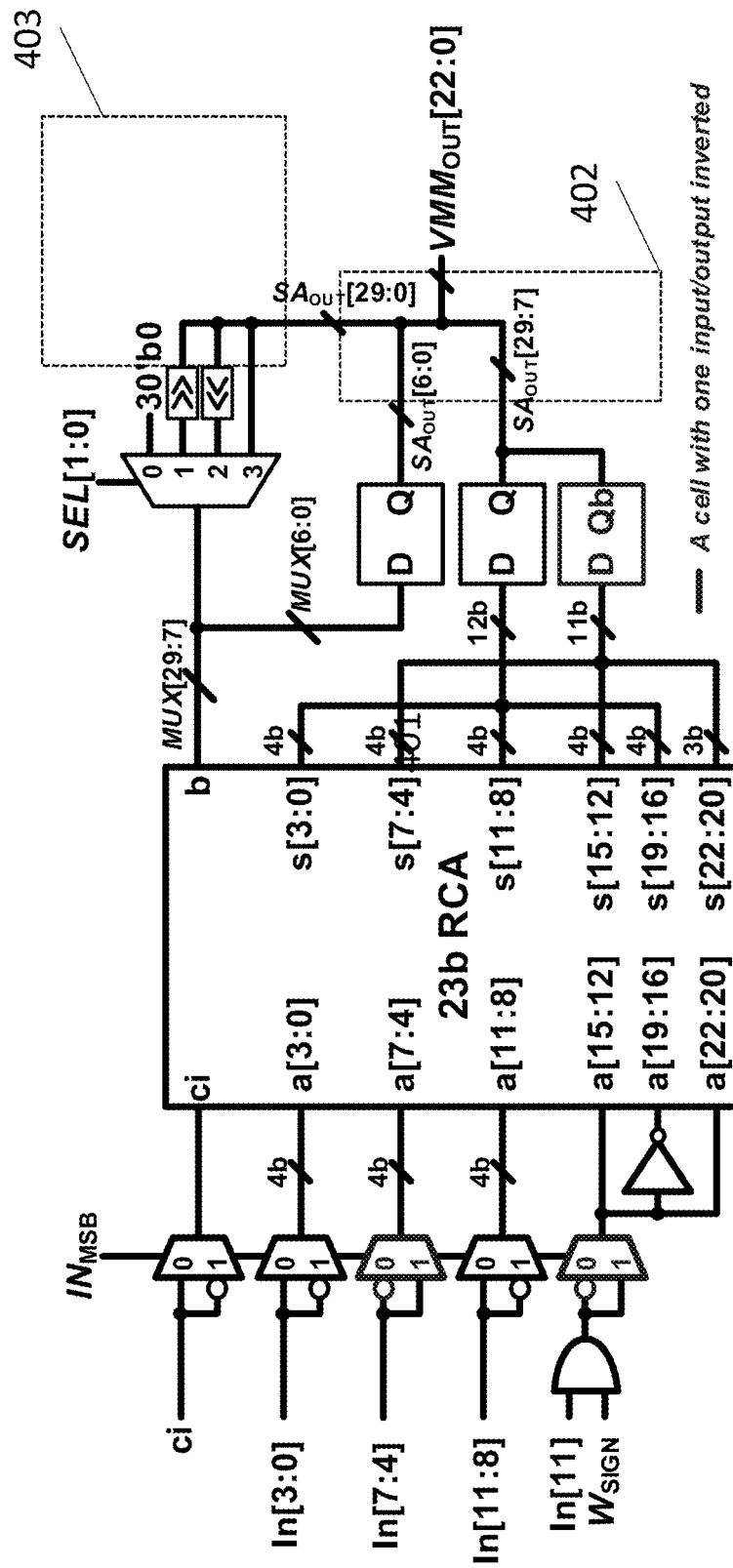
FIG. 4 provides a diagram showing an example Bit-first shift-and-accumulator (BFA) in accordance with the disclosed subject matter.

Bit-First Accumulation Hardware: The disclosed subject matter also provides the bit-first accumulation (BFA) hardware. FIG. 4 shows the microarchitecture of BFA. It has a 23b RCA 401, a 30b register 402, and bi-directional shifters 403. It performs shift-and-accumulation on the output of HCA (partial sums) based on the proposed BFA scheme.

Figure 5:
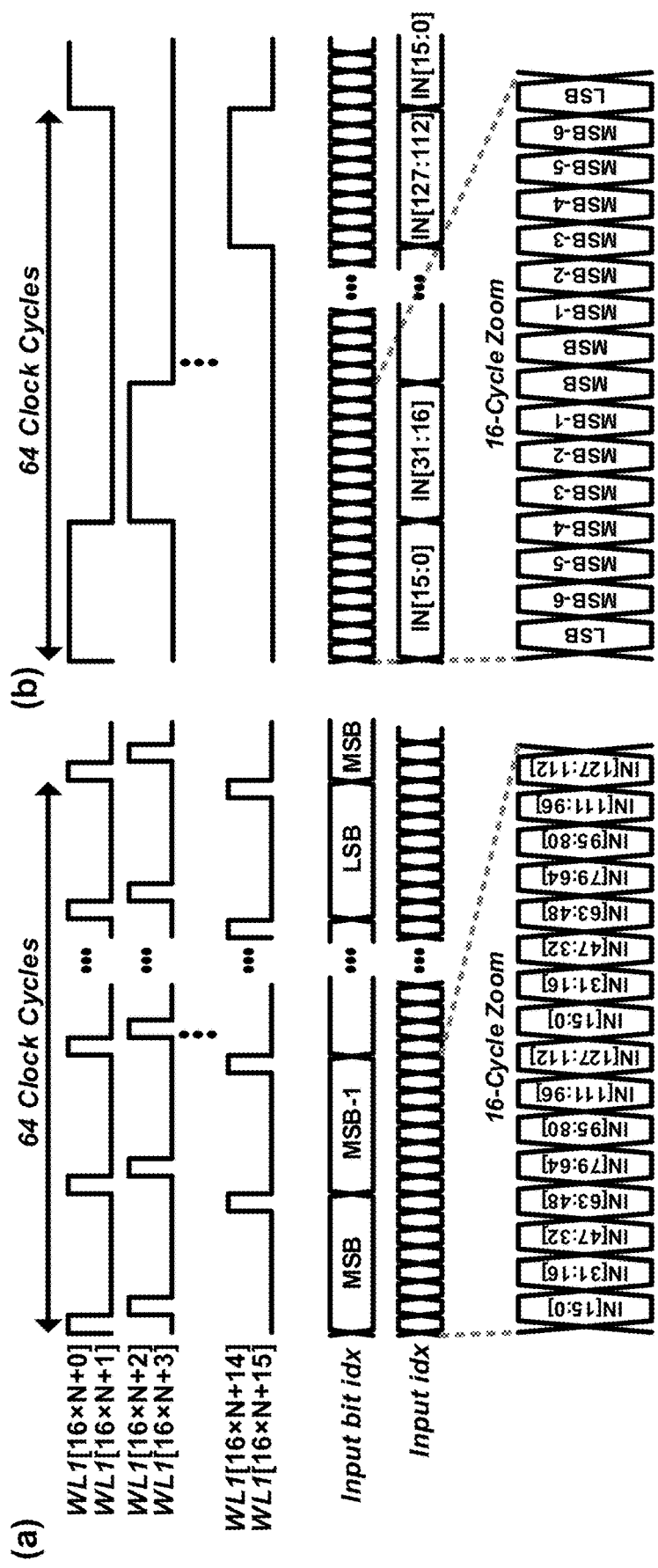
FIG. 5(*a*) provides a diagram showing a conventional input-first accumulation scheme.

As shown in FIG. 5(a), the conventional scheme can accumulate the partial products across inputs and input bits first. If applied on D6CIM, it can first accumulate the partial products of 16 inputs' MSBs and 16 weights (all bits), then the next 16 inputs and weights to the last 16 inputs and weights. Then, it repeats the process using the next MSBs of the first 16 inputs. This scheme can cause frequent switching on WLs and LBLs since it needs to access new weights every cycle.

Instead, the disclosed scheme can accumulate the partial products across input bits first and then inputs (FIG. 5(b)). In other words, D6CIM first accumulates the partial products of 16 inputs' MSBs and 16 weights (all bits), then the same inputs' second MSBs and the same weights to the inputs' LSBs. Then, it repeats the accumulation using the subsequent 16 inputs and 16 weights. This disclosed scheme can reduce the switching activities on WL and LBLs by ~8× since it does not access new weights until it processes all 8 bits of inputs and thereby does not switch WLs and LBLs. The reduced switching activities can largely improve energy efficiency.

Also, the disclosed subject matter provides the bi-directional bit-serial input scheme to reduce the area of the BFA. As shown in FIG. 5(a), conventionally input bits were fed in one direction, from MSB to LSB. To support 8b inputs in such a uni-directional bit-serial input scheme, one 1b left shifter and one 8b right shifter are required. However, to flexibly support 1-to-8b inputs, nine shifters and a 9:1 multiplexer are required, causing a large area overhead.

The disclosed bi-directional bit-serial input scheme can alternate the bit-serial direction, e.g., from LSB to MSB, then from MSB to LSB (FIG. 5(b)). In this scheme, only 1b left and right shifters and one 4:1 multiplexer are needed, largely helping to reduce the area of BFA while providing flexible 1-to-8b computation.

Figure 6:
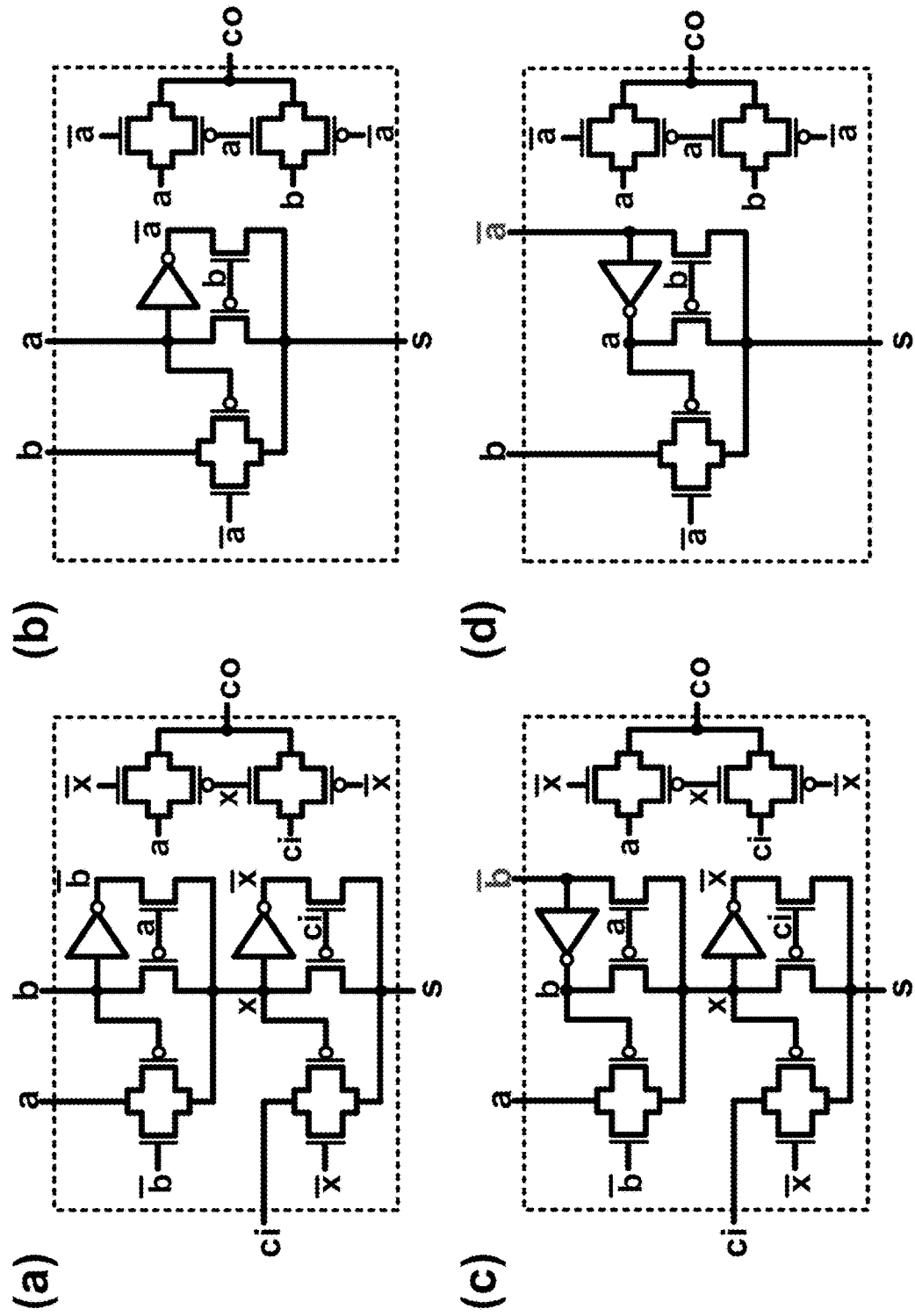
FIG. 6(*a*) provides a diagram showing an example TG-based FA in accordance with the disclosed subject matter.

Circuit and Physical Design Optimizations: The HCA and BFA contain many full adder (FA) cells. The conventional CMOS adder requires ~28 transistors. To minimize the area overhead, the disclosed subject matter adopts the area-efficient transmission-gate (TG)-based FA (FIG. 6a) and HA (FIG. 6b). Compared to the pass-gate-based cells, the TG-based cells do not induce a $V_{th}$ drop.

Figure 7:
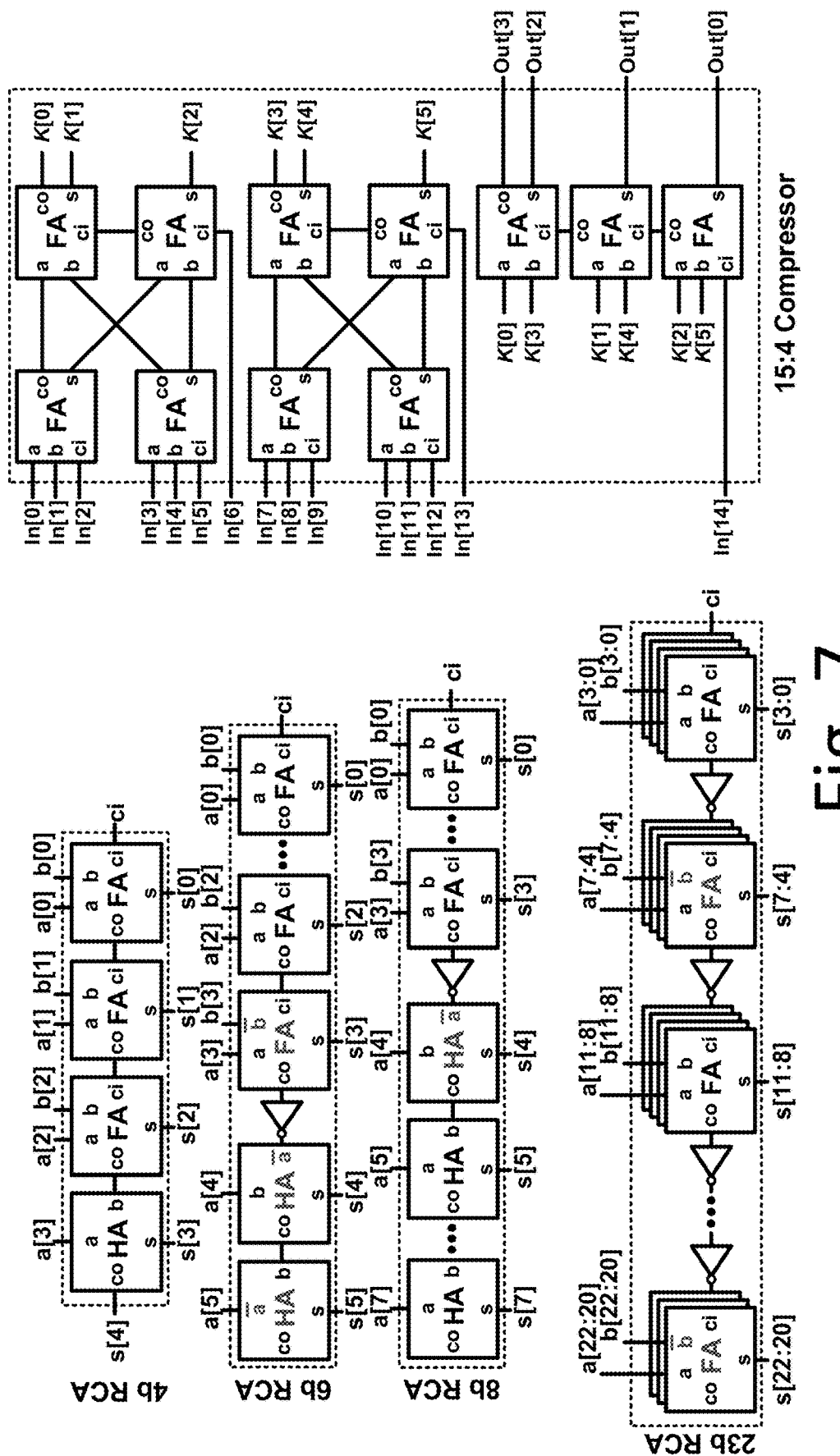
FIG. 7 provides a diagram showing example 4b, 6b, 8b, 23b RCAs, and 15:4 compressor in accordance with the disclosed subject matter.

The disclosed RCAs and compressors were designed using the TG-based FAs and HAs (FIG. 7). Connecting too many TGs in series, however, degrades signal slew and delay. Therefore, inverters were added to restore the slew. Those inserted inverters, however, cause polarity changes. Consequently, the FA and HA versions were developed with one input inverted (FIG. 6c illustrated an inverted FA; FIG. 6d illustrates an inverted HA), and some regular FAs and Has were replaced with the input-inverted versions. Similarly, in designing the BFA, the polarity-inverted multiplexers and D-flip-flops (DFF) were reduced to ensure the correctness of logic without adding extra inverters (FIG. 4).

Figure 8:
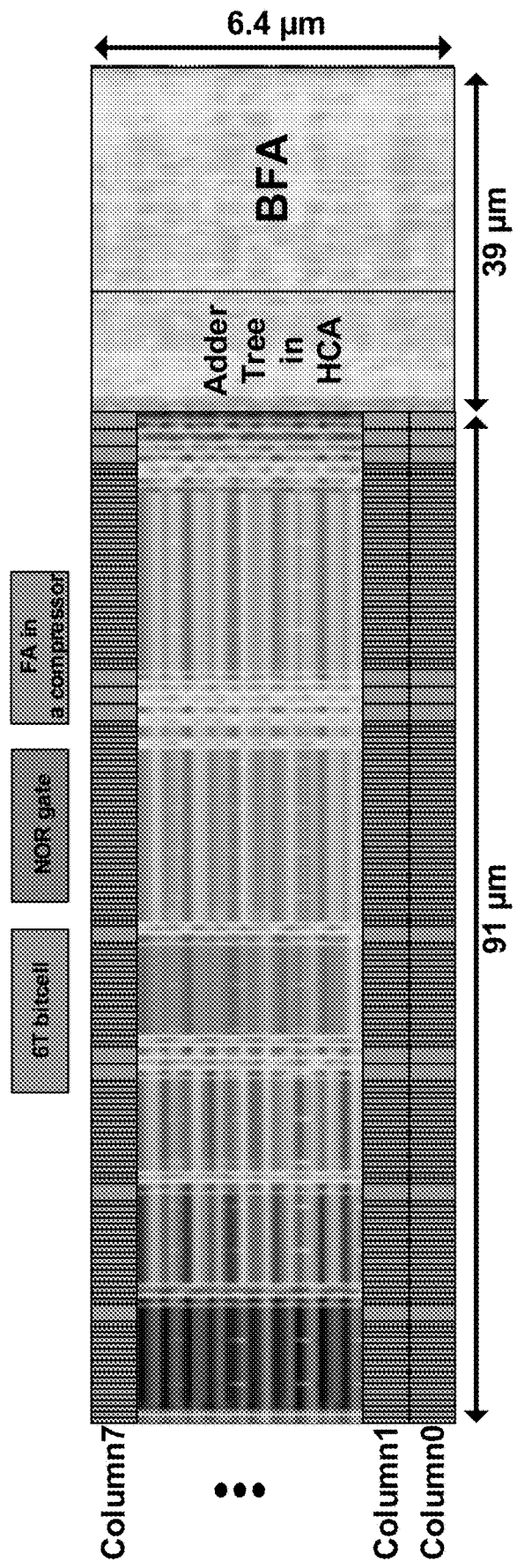
FIG. 8 provides a diagram showing an example layout of the 8 columns, HCA, and BFA in accordance with the disclosed subject matter.

During the physical design, the disclosed subject matter was designed to shorten critical wires such as LBLs, WLs, and ILs since these wires' parasitic resistance and capacitance strongly impact throughput and energy efficiency. FIG. 8 shows the layout of the 8 columns and the corresponding HCA and BFA modules. Right below each 16-bitcell sub-column, two NOR gates were placed, minimizing the length of LBLs. Next, the 11 FAs, which form one 15:4 compressor, are distributed in each column to reduce the wire length from the NOR gates. Then, the adder tree of the HCA and the BFA were added below the 8 columns. This placement minimizes the width of the 8 columns, thereby shortening WLs.

Figure 9:
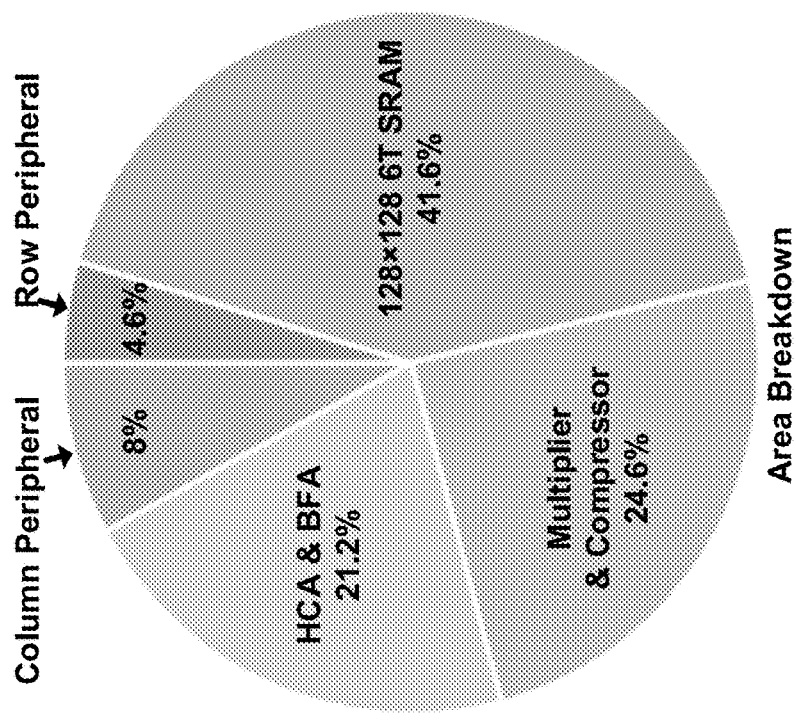
FIG. 9 provides a diagram showing an example Die micrograph and area breakdown in accordance with the disclosed subject matter.
Figure 9:
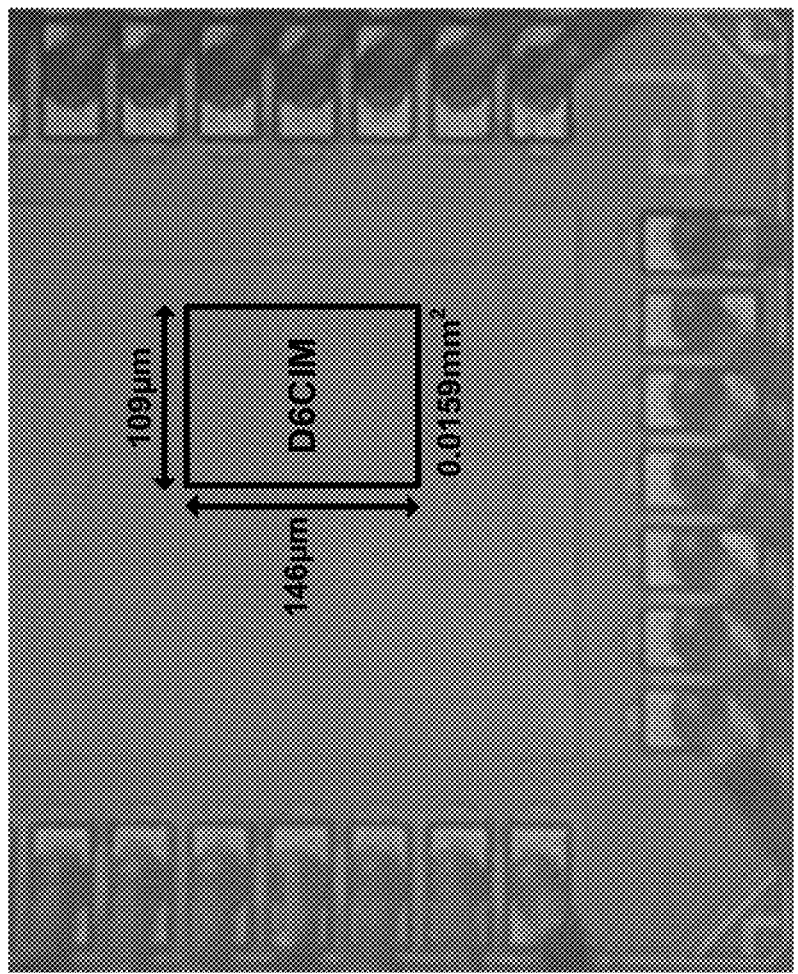

Measurement Results: the D6CIM test chip in a 28-nm CMOS was prototyped. It takes 0.0159 mm² (FIG. 9). The bitcell is drawn in a logic rule, whose footprint is 0.379 μm². The 16-Kb bitcells take 41.6% of the total area, while the arithmetic hardware takes 45.8%. The row and column peripherals take 12.6%. The macro achieves an excellent weight density of 1005 Kb/mm².

Figure 10:
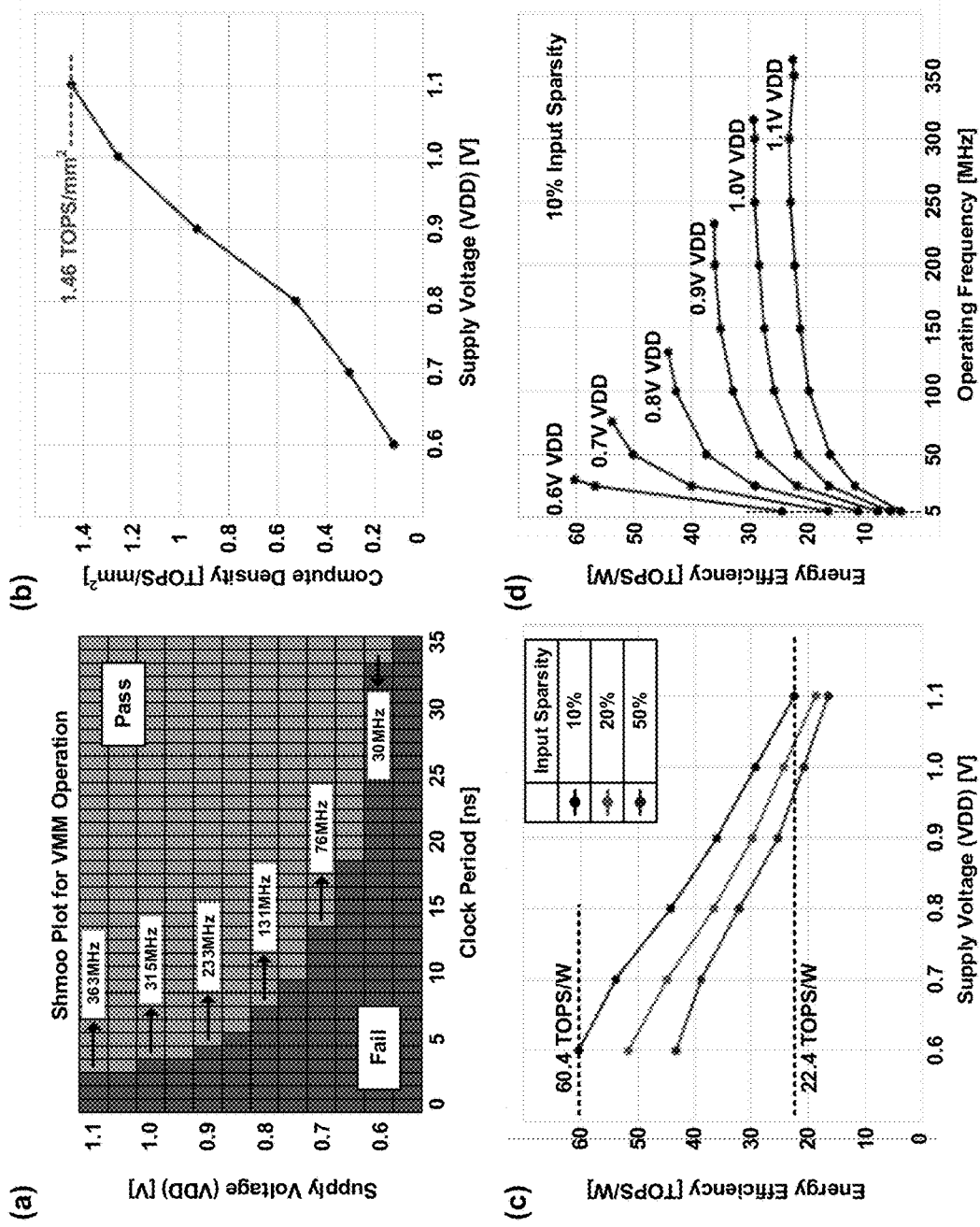
FIG. 10(*a*) provides a graph showing an example measured shmoo plot of VMM operation in accordance with the disclosed subject matter.

FIG. 10(a) shows the measured shmoo plot of VMM operation across 0.6-1.1V. The maximum clock frequency is 360 MHz at 1.1V. FIG. 10(b) shows the measured compute density, where D6CIM achieves the peak compute density of 1.46 TOPS/mm² at 1.1V. FIG. 10(c) shows the energy efficiency measurement across VDDs and input sparsities. D6CIM achieves the peak energy efficiency of 60.4 TOPS/W at 0.6V and 10% input sparsity. FIG. 10(d) shows the energy efficiency measurement across clock frequencies.

TABLE 1

|  | This work | ISSCC'21 [1] Y.-D. Chih | ISSCC'22 [2] F. Tu | ISSCC'22 [3] H. Fujiwara | ISSCC'22 [4] D. Wang | VLSI'22 [5] C.-F. Lee | ISSCC'22 [6] B. Yan |
|---|---|---|---|---|---|---|---|
| Process [nm] | 28 | 22 | 28 | 5 | 28 | 12 | 28 |
| VMM Operation | Digital CIM | Digital CIM | Digital CIM | Digital CIM | Digital CIM | Digital CIM | Digital CIM |
| Transistors of cells and multipliers/bit | 6T + 0.5T | 6T + 4T | — | 12T + 1T | 6T + 2T | — | 6T+0.25T |
| Array Size [b] | 16K | 64K | 96K | 64K | 16K | 8K | 32K |
| Supply Voltage [V] | 0.6-1.1 | 0.72 | 0.6-1.0 | 0.5-0.9 | 0.45-1.1 | 0.72 | 0.8 |
| Frequency [MHz] | 30-360 | 500 | 50-220 | 360-1140 | 250 | 800 | 333 |
| Input Precision [b] | 1-8 | 1-8 | 8, 16 | 4 | 1-4 | 4-8 | 1-8 |
| Weight Precision [b] | 8 | 4, 8, 12, 16 | 8, 16 | 4 | 1 | 4, 8 | 1, 4, 8 |
| Full-Precision Output | Yes | Yes | Yes | Yes | No | Yes | Yes |
| Singed/Unsigned VMM Support | Yes | Yes | Yes | Yes | No | Yes | No |

TABLE 1-continued

|  | This work | ISSCC'21 [1] Y.-D. Chih | ISSCC'22 [2] F. Tu | ISSCC'22 [3] H. Fujiwara | ISSCC'22 [4] D. Wang | VLSI'22 [5] C.-F. Lee | ISSCC'22 [6] B. Yan |
|---|---|---|---|---|---|---|---|
| Bitcell Area [µm²] | 0.379 | 0.379 | — | 0.075 | 0.862 | — | 0.257 |
| Macro Area [µm²] | 0.0159 | 0.202 | 0.941 | 0.0133 | 0.049 | 0.0323 | 0.03 |
| Weight Density [Kb/mm²] | 1005 | 316 | 102 | 4812 | 326 | 247 | 1067 |
| [1])Norm. Weight Density [Kb/mm²] | 1005 | 195 | 102 | 153 | 326 | 45.4 | 1067 |
| [2])Energy Efficiency [TOPS/W] | 22.4-60.4 | 24.7 | 30.8-57.8 | 17.5-63 | 9.6-15.5 | 30.3 | 27.3 |
| [2])Compute Density [TOPS/mm²] | 0.12-1.46 | 4.53 | 1.43 | 13.8-55.25 | 2.59 | 10.40 | 0.17 |
| [1,2])Norm. Compute Density [TOPS/mm²] | 0.12-1.46 | 2.80 | 1.43 | 0.44-1.76 | 2.59 | 1.91 | 0.17 |

Figure 11:
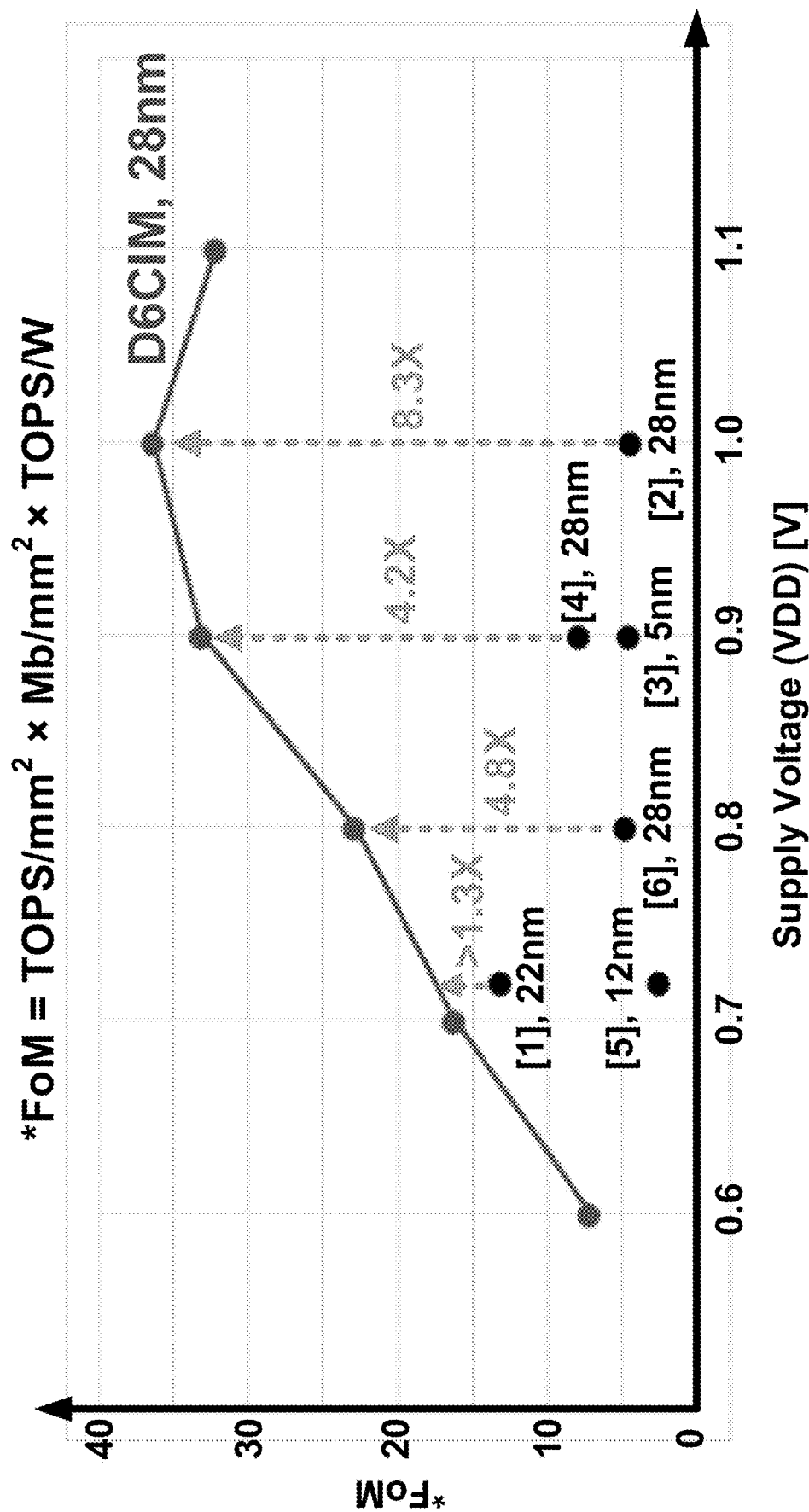
FIG. 11 provides a graph showing a comparison with the prior works in the proposed FoM. FoM=(norm. comp. density)×(norm. weight density)×(energy efficiency) in accordance with the disclosed subject matter.

[1])Area is normalized quadratically to the 28-nm node.
[2])One operation is defined as an 8b multiplication or addition Table I shows the comparisons to the prior DCIM works. As compared to the [ropr DCIM works, which achieve the best-normalized weight density, D6CIM achieves 8.6× better compute density and 2.2× better energy efficiency at a similar weight density. For simpler comparisons, a figure-of-merit (FoM), which is defined as FoM=(norm. comp. density)×(norm. weight density)×(energy efficiency), is shown. FIG. 11 shows the comparisons using this FoM. D6CIM achieves up to 8.3× better FoM as compared to the prior works.

The disclosed subject matter provides a D6CIM for 1-to-8b fixed-point computation. A novel time-sharing architecture can be created with three new techniques: static dual wordline access, hybrid compressor adder tree, and bit-first shift-and-accumulation. The measurements of the prototype chip demonstrate that D6CIM advances the prior arts in the product of the three key metrics.

Example 2: FleXIMM: A 1005-Kb/mm2 60.4-TOPS/W 8-Bit 6T-SRAM-Based Digital Computing-in-Memory Macro Supporting Flexible Input Dimension in 28-nm CMOS In this example, the disclosed subject matter provides a DCIM macro, hereinafter called FleXIMM, which overcomes certain trade-off between weight density and compute density by using an efficient bitcell-access scheme and an adder-optimization technique. In addition, FleXIMM can deal with 16-128 input dimensions without degradation of compute density by exploiting a flexible shift-and-accumulator (FSA). Using these features, an example FleXIMM fabricated in 28 nm achieves the state-of-the-art weight density (1005 Kb/mm²) and compute density (1.46 TOPS/mm²) simultaneously while exhibiting 60.4 TOPS/W.

Figure 12:
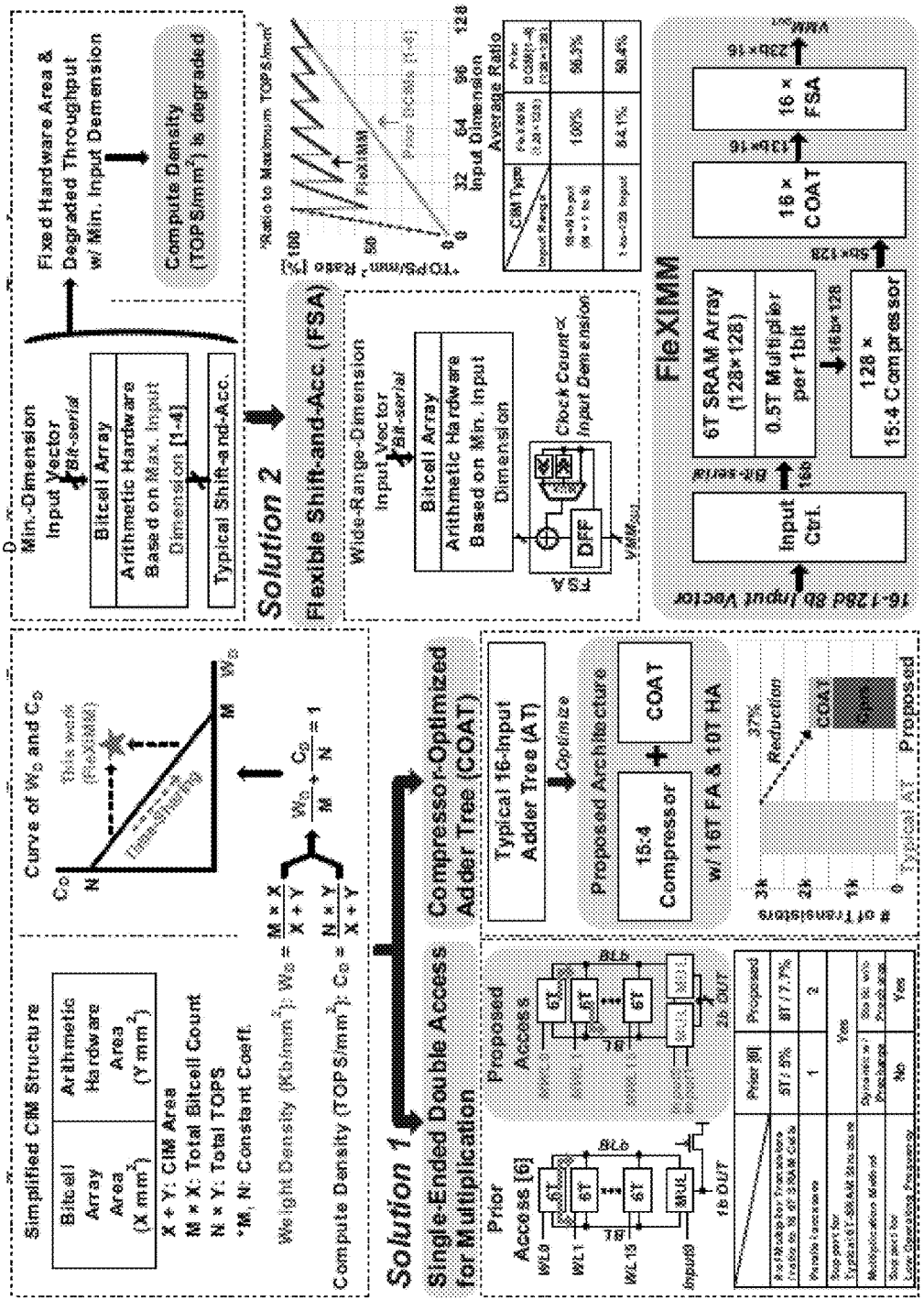
FIG. 12 provides a diagram showing example architecture in accordance with the disclosed subject matter.

FIG. 12 left shows how to address the prior trade-off between weight density and compute density. First, multiplication is conducted using the single-ended double-access scheme while retaining an industry-standard 6T-SRAM structure. In order to get double throughput with the 6T structure, a bitline (BL) and BLb are separately exploited to access two different bitcells at the same time. Second, to reduce an area while keeping throughput, a compressor and a compressor-optimized adder tree (COAT) are used instead of a typical adder tree (AT). By using this optimization with 16T full-adder (FA) and 10T half-adder (HA) cells, the required transistor count is reduced by 37%.

FIG. 12 right shows the FSA exploited to resolve the prior input-dimension range issue (i.e., support of a wide-range input dimension without degradation of compute density). To support the various input dimensions, the arithmetic hardware is designed based on a minimum input dimension (16d), and the FSA can serially accumulate the 16d-input partial-sum VMM up to the 128d-input VMM based on a time-sharing manner. Since the total clock count is proportional to the targeted input dimension, throughput is kept unchanged regardless of the various input dimensions. Using the FSA, FleXIMM can retain maximum compute density in 16-multiple input dimensions.

Figure 13:
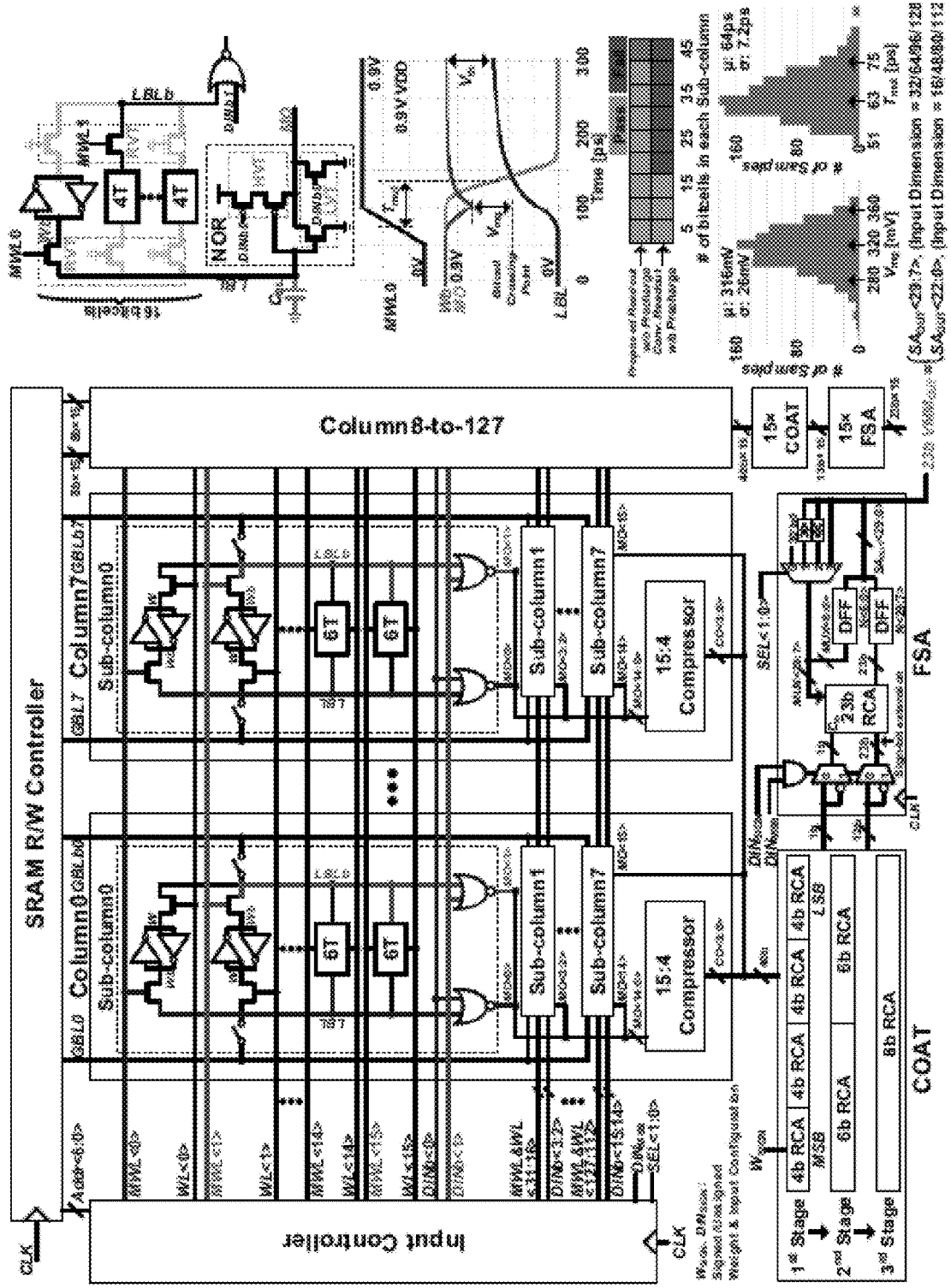
FIG. 13 provides a diagram showing an example detailed structure of FleXIMM (left), operation of single-ended double access without precharge (top right), and Monte-Carlo simulation of Vmg for prevention of read upset (bottom right) in accordance with the disclosed subject matter.

FIG. 13 left shows the detailed circuits of FleXIMM. It has a 128×128 6T SRAM array. 8b weights were targeted; thus, the array can store up to 128×16 weights. Each column contains eight sub-columns, each having 16 6T bitcells and two 1b multipliers (two NOR gates). The even (odd)-numbered multiply-accumulate wordlines (MWL) drive the left (right) access transistors of bitcells. The other access transistors are connected to WLs. Each column contains one 15:4 compressor. Every eight columns share one COAT and one FSA.

FleXIMM performs an 8b 128×16d (dimension) VMM in the following process. It first activates two consecutive MWLs in each sub-column, which transfers two weight bits, via local BL (LBL) and LBLb, to the multipliers in that sub-column. At the same time, the input controller feeds two input activation bits (DINb) to the multipliers in each sub-column, which produce two multiplication outputs (MO). Since each column has eight sub-columns, a column generates a total of 16 MOs, which the 15:4 compressor in the column compresses into a 4b compressor output (CO). Then, the COAT takes eight COs from eight columns to produce a 13b COAT output. This process was repeated eight times for the rest of the input bits and then the whole process again eight times for the rest of the bitcells in each sub-column. Over the total 64 iterations, each COAT produces 64 outputs, which the FSA accumulates using 1b bi-directional shifters every clock cycle. Finally, the 23b 16d vector output is produced.

Figure 2:
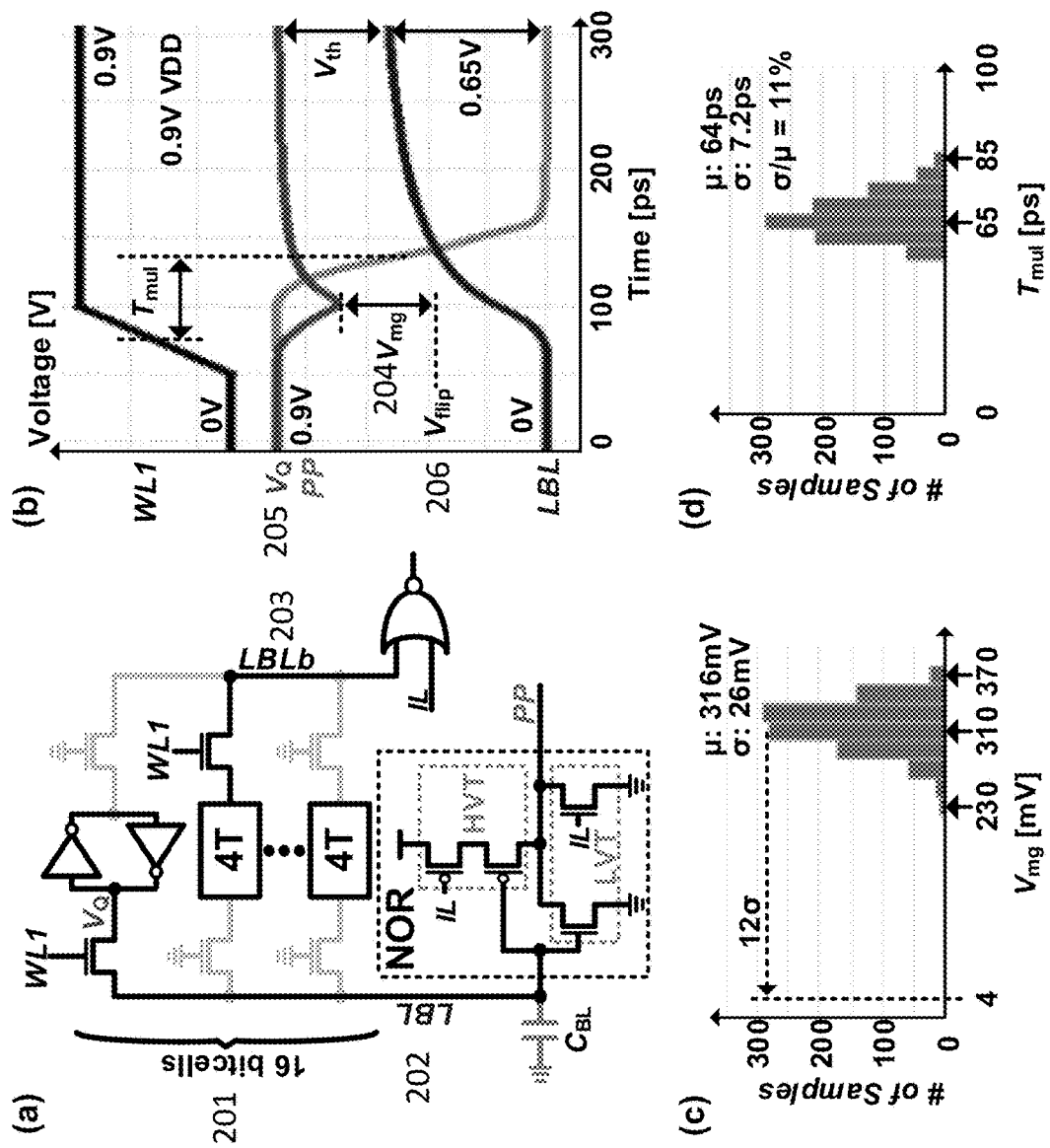
FIG. 2(a) provides a diagram showing an example static dual-wordline access scheme in accordance with the disclosed subject matter.
FIG. 2(b) provides a graph showing a timing diagram in accordance with the disclosed subject matter.
FIGS. 2(c)-2(d) provide graphs showing the Monte-Carlo simulation results of (c) Vmg and (d) Tmul in accordance with the disclosed subject matter.

During the VMM operation, FleXIMM accesses the bitcells in a single-ended manner without precharge, which can reduce the voltage swing on LBL and LBLb for lower dynamic power (FIG. 2 right). We, therefore, skew the PN ratio of the NOR gates (multipliers) to better interface with the low-swing signals. In a typical differential single-access scheme, readout without precharge can cause read upset. However, in the disclosed single-ended double access, the probability of read-upset occurrence is quite lower because the one-side voltage of an inverter logic (INV) pair in the bitcell is fixed while the other is connected to LBL or LBLb. Moreover, to fully eliminate read-upset risk, the number of bitcells in one sub-column was limited to reduce the parasitic capacitance of LBL and LBLb. Monte-Carlo simulations were performed while sweeping the number of bitcells in one sub-column. It confirms no read upset for up to 40 bitcells under the 3.8-σ worst case. In FleXIMM, 16 bitcells were selected to ensure the voltage margin (Vmg) is positive even under the 12-σ worst case.

Figure 14:
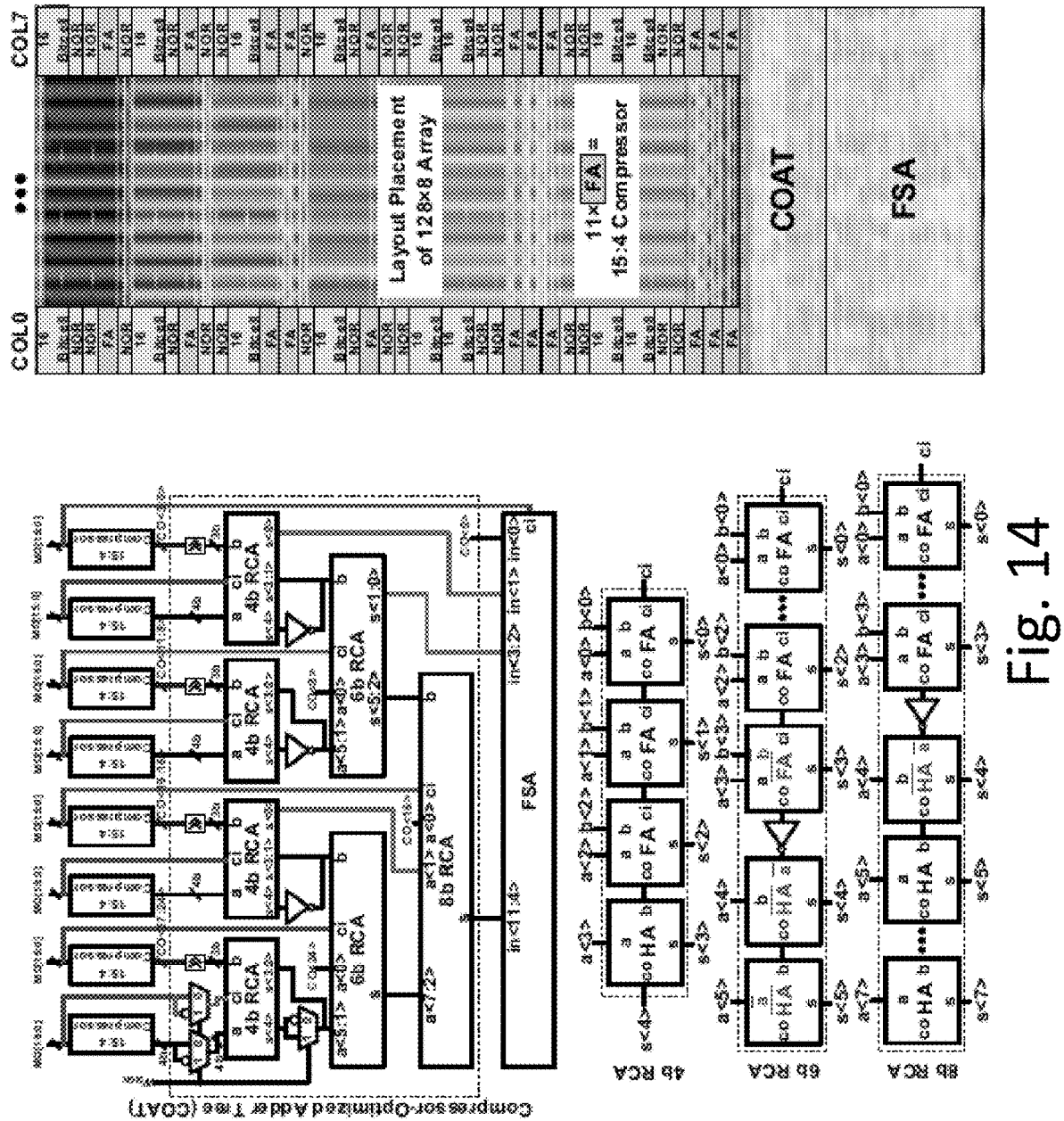
FIG. 14 provides a diagram showing an example detailed structures of COAT and RCAs (left) and layout placement of 128×8 FleXIMM (right) in accordance with the disclosed subject matter.

The arithmetic logic was minimized from the compressors to the COAT to the FSA (FIG. 14 top left). Recall that eight columns produce 128 MOs (=16×8). To compress them, nine 15:4 compressors and a 9-input AT are required. Instead, the arithmetic logic was improved to employ only eight 15:4 compressors and the 8-input COAT. To do so, in the COAT, the carry-in ports of RCAs were used for the remaining MOs the compressors did not take. To further improve the RCAs regarding right-shift bits in the COAT, HA cells are exploited (FIG. 14 bottom left).

In the physical design, the disclosed subject matter was designed to shorten critical wires such as LBL, LBLb, and MWL. These wires have a large amount of parasitic resistance and capacitance, thereby strongly impacting energy efficiency. To minimize the length, only the multipliers and 15:4 compressors were placed within the bitcell array (FIG. 14 right).

Figure 15:
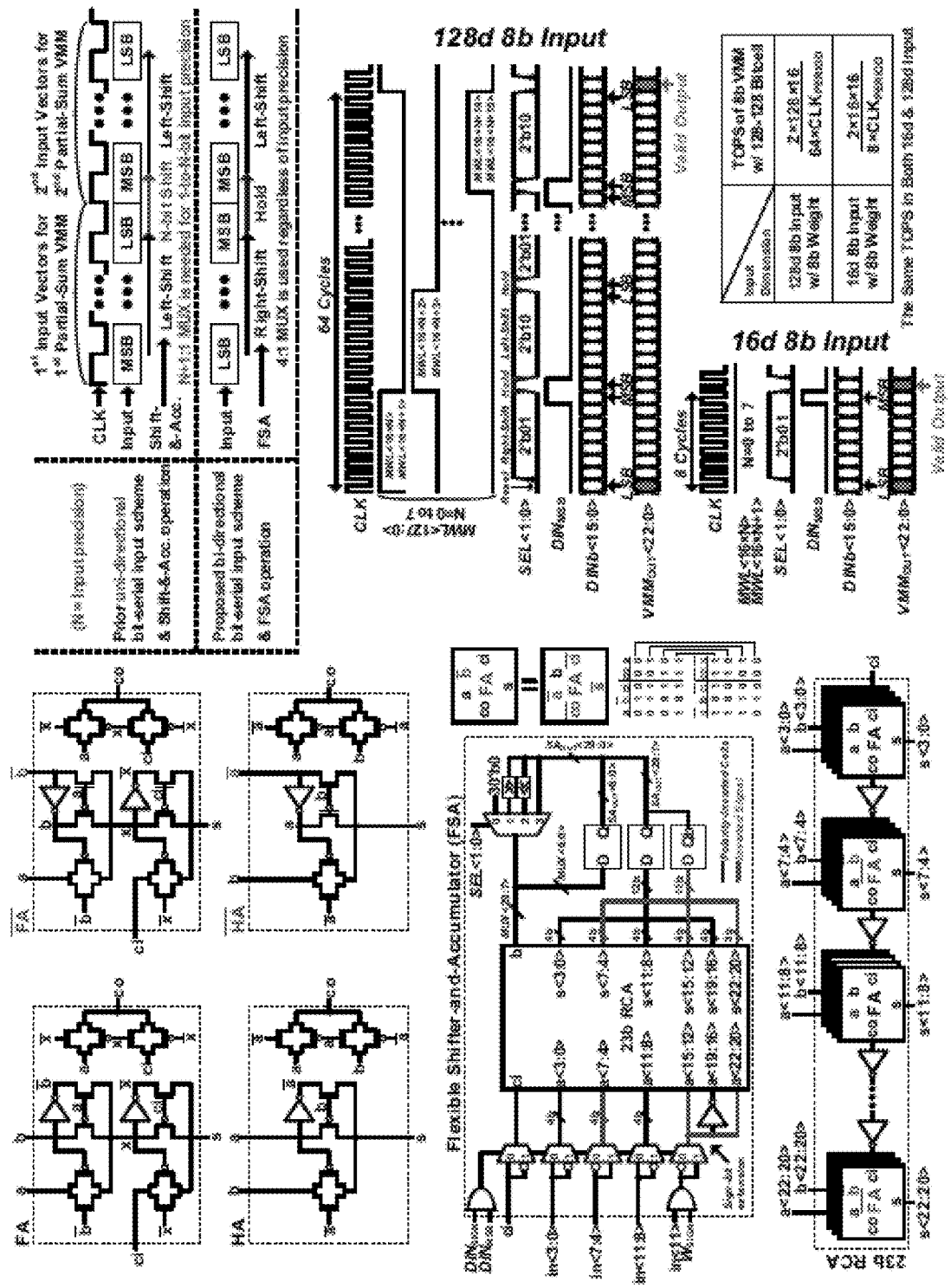
FIG. 15 provides a diagram showing an example circuit implementation of FA cell, HA cell, and FSA (left), proposed bi-directional bit-serial input scheme (top right), and timing diagram of 16d- and 128d-input VMM operation (bottom right) in accordance with the disclosed subject matter.

The disclosed subject matter adopts the transmission gate (TG)-based 16T FA and 10T HA cells for a compact area (FIG. 15 top left). The compressors and RCAs were designed using those cells. In the RCAs, INV is added to avoid having many TGs in series. The INV causes a polarity change, which is reversed by employing the polarity-inverted version of FA and HA cells. The FSA also employs the polarity-inverted MUXs and D-flip-flops to reverse the inverted polarity of 23b RCA (FIG. 15 bottom left).

The disclosed subject matter provides the bi-directional bit-serial input scheme to reduce FSA's area (FIG. 15 top right). Prior DCIMs adopted a uni-directional scheme, which requires an N-bit shifter for an N-bit input in performing the serial accumulation for the partial-sum VMM. Then, to support 1-to-8b input bitwidth, they need to employ eight shifters and a 9:1 MUX, causing a large area overhead. However, using the bi-directional bit-serial input scheme, the disclosed FSA needs only two 1b bi-directional shifters and one 4:1 MUX, resulting in a compact area.

FleXIMIM can achieve the same compute density as long as the input dimension is multiples of 16, as shown in the timing diagram of VMM (FIG. 4 bottom right). To complete one 128d-input VMM, FleXIMM takes 64 clock cycles by using the four modes (reset, bi-directional shift, hold) of the 4:1 MUX in the FSA. For the 16d-input, on the other hand, it requires only eight cycles with the same process. Hence, the same compute density is achieved in 16d- and 128d-input VMM.

Figure 16:
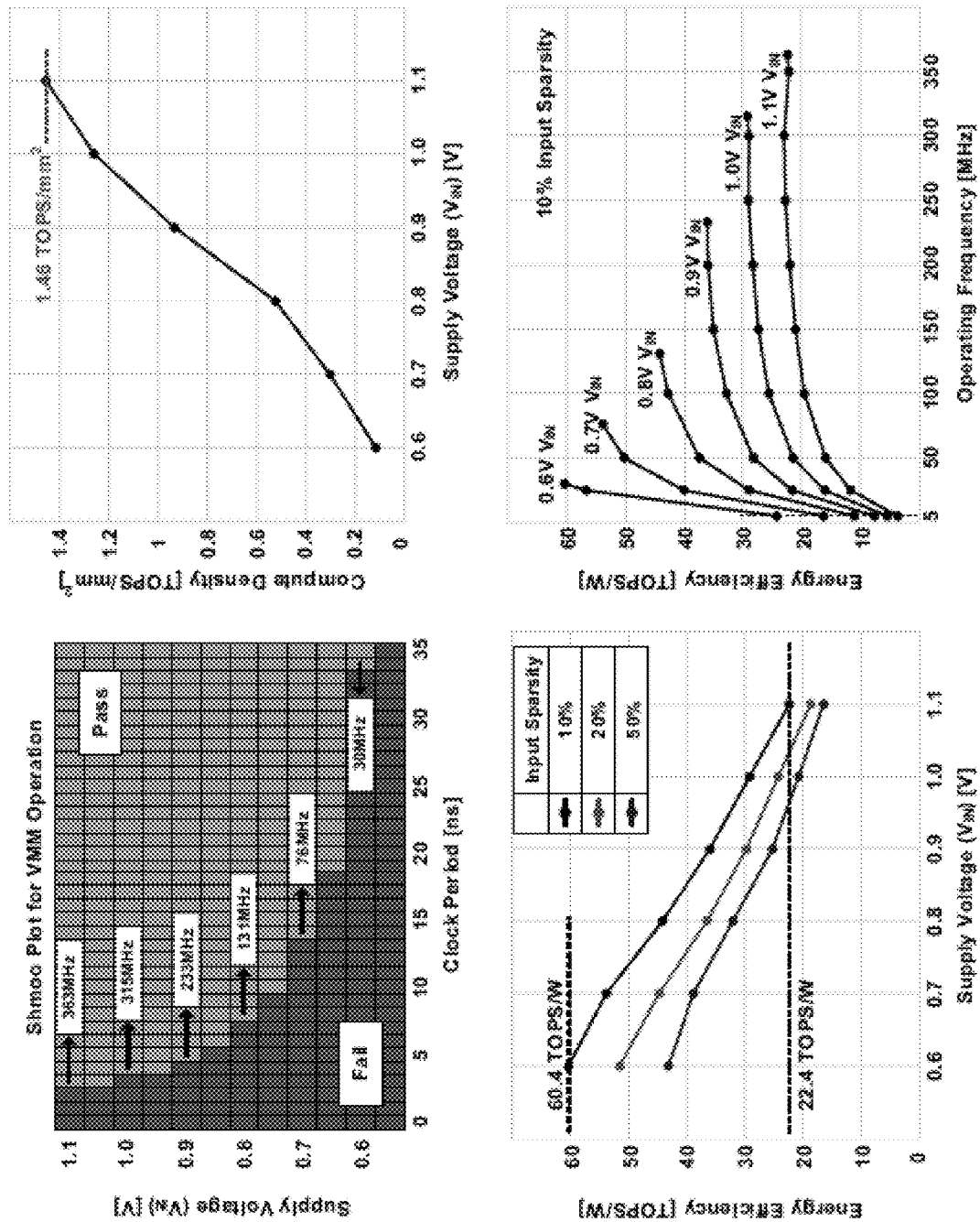
FIG. 16 provides a diagram showing an example measured shmoo plot of VMM operation, measured compute density (TOPS/mm2) (top), and measured energy efficiency (TOPS/W) across supply and operating frequency (bottom) in accordance with the disclosed subject matter.
Figure 17:
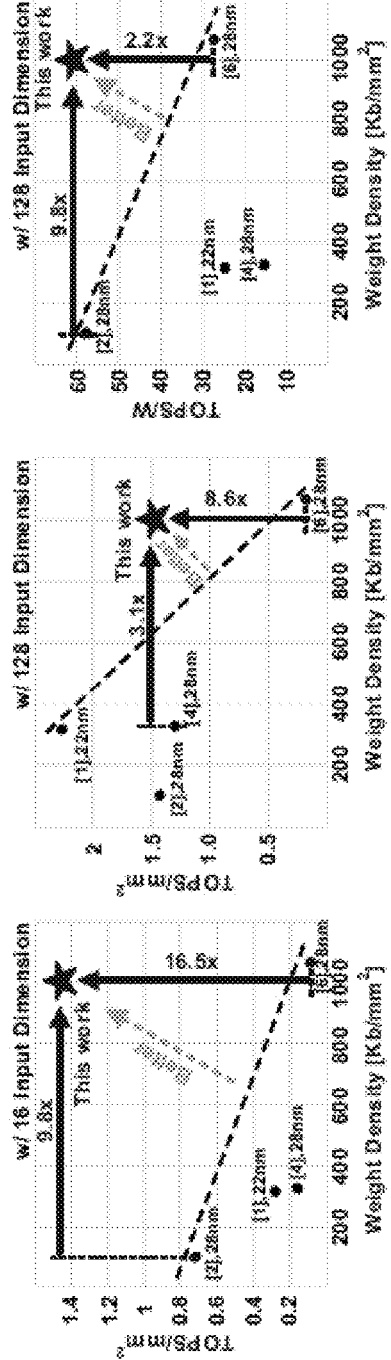
FIG. 17 provides a diagram showing an example performance comparison to prior DCIM designs in accordance with the disclosed subject matter.

An example FleXIMM chip in a 28-nm CMOS disclosed herein. It takes 0.0159 mm$^2$, marking the weight density of 1005 Kb/mm$^2$. FIG. 16 shows the measurement results. At 1.1-V supply, FleXIMM can operate at 363 MHz, achieving the compute density of 1.46 TOPS/mm$^2$. It marks the energy efficiency of 60.4 TOPS/W in 10% input sparsity and 0.6 V. FIG. 17 shows a comparison with certain DCIMs. For the same compute density, it achieves 3.1× better weight density, while for the same weight density, it achieves 8.6× better compute density. FleXIMM can also achieve the same compute density across the input dimensions from 16 to 128, in contrast to certain designs that exhibit proportionally worse compute density as the input dimension reduces.

The present disclosure is well adapted to attain the ends and advantages mentioned as well as those that are inherent therein. The particular embodiments disclosed above are illustrative only, as the present disclosure can be modified and practiced in different but equivalent manners apparent to those skilled in the art having the benefit of the teachings herein. Furthermore, no limitations are intended to the details of construction or design herein shown other than as described in the claims below. It is, therefore, evident that the particular illustrative embodiments disclosed above can be altered or modified, and all such variations are considered within the scope and spirit of the present disclosure.

The invention claimed is:

1. A compute-in-memory (CIM) device, comprising
a static random access memory (SRAM) array including
a plurality of column structures, wherein each column structure comprises eight sub-column structures;
wherein each sub-column structure comprises at least one bitcell sharing a pair of a local bitline (LBL) and local bitline bar (LBLb),
wherein the LBL and LBLb are connected to a pair of global bitlines (GBL) via switches,
wherein each sub-column comprises at least one NOR gate,
wherein an even-numbered bitcell comprises a wordline 1 (WL1) for a left access transistor, and an odd-numbered bitcell comprises a wordline 2 (WL2) for a right access transistor; and
wherein every eight columns (8 columns) are configured to share a hybrid compressor adder-tree (HCA) structure, followed by a bit-first accumulation (BFA) structure.

2. The CIM device of claim 1, wherein the CIM device is configured to perform a static dual wordline access without a pre-charging operation by accessing two consecutive bitcells in each sub-column using the LBL and the LBLb.

3. The CIM device of claim 1, wherein the HCA includes a plurality of 15:4 compressors followed by a 4b 8-input adder tree.

4. The CIM device of claim 2, wherein the adder tree comprises a carry-in port of ripple carry adders (RCA), wherein the RCA is 4b RCAs, 6b RCAs, 8b RCAs, or combinations thereof.

5. The CIM device of claim 1, wherein the BFA comprises a 23b RCA, a 30b register, and bi-directional shifters to perform the shift-and-accumulate on an output of HCA (partial sums).

6. The CIM device of claim 5, wherein the BFA is configured to accumulate the partial products across input bits first and then inputs.

7. The CIM device of claim 1, wherein the BFA is configured to a bi-directional bit-serial input operation.

8. The CIM device of claim 1, wherein the HCA and the BFA comprise area-efficient transmission-gate (TG)-based full adder cell (FA) and half adder (HA).

9. The CIM device of claim 8, wherein the FA is an input-inverted FA and/or wherein the HA is an input-inverted HA.

10. The CIM device of claim 1, wherein the BFA comprises a polarity-inverted multiplexer and a D-flip-flop (DFF).

11. The CIM device of claim 1, wherein the at least one NOR gate is configured to be a 1b multiplier.

12. The CIM device of claim 1, wherein the CIM device comprises 16 HCAs and 16 BFAs.

13. The CIM device of claim 1, wherein the SRAM array comprises a row peripheral configured to control a vector-matrix multiplication (VMM) operation and a SRAM Read/Write (R/W) operation.

14. The CIM device of claim 1, wherein the SRAM array comprises a column peripheral configured to control GBLs for the SRAM R/W operation.

15. A method for performing vector-matrix multiplication comprising:
activating two consecutive wordline 1s (WL1s) in each sub-column of a compute-in-memory (CIM) device, wherein the WL1s are configured to transfer two weight bits, via LBL and LBLb, to the two NOR gates in the sub-column;

feeding corresponding two input activation bits via TLs to the NOR gates using a row peripheral of the CIM device;

generating a total of 16 8-b partial products using the column, where each column comprises eight sub-columns;

adding up the 16 partial products and producing partial sums using an HCA;

performing a shift-and-accumulate the partial sums using BFA;

producing a VMM result using the results from the shift-and-accumulate the partial sums.

16. The method of claim 15, wherein the VMM result is produced from an 8b 128×16d (dimension) VMM in 64 clock cycles.

17. The method claim 15, wherein the VMM result is a 23b 16d vector.

* * * * *